(12) United States Patent
Tonouchi

(10) Patent No.: US 10,567,306 B2
(45) Date of Patent: Feb. 18, 2020

(54) COMMUNICATION MANAGEMENT LIST GENERATION DEVICE, COMMUNICATION MANAGEMENT LIST GENERATION METHOD, AND STORAGE MEDIUM IN WHICH COMMUNICATION MANAGEMENT LIST GENERATION PROGRAM IS STORED

(71) Applicant: NEC Corporation, Minato-ku, Tokyo (JP)

(72) Inventor: Toshio Tonouchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 9 days.

(21) Appl. No.: 15/766,883

(22) PCT Filed: Sep. 20, 2016

(86) PCT No.: PCT/JP2016/004267
§ 371 (c)(1),
(2) Date: Apr. 9, 2018

(87) PCT Pub. No.: WO2017/064833
PCT Pub. Date: Apr. 20, 2017

(65) Prior Publication Data
US 2018/0295070 A1    Oct. 11, 2018

(30) Foreign Application Priority Data
Oct. 13, 2015 (JP) .................. 2015-202276

(51) Int. Cl.
*H04L 12/28* (2006.01)
*H04L 12/933* (2013.01)
(Continued)

(52) U.S. Cl.
CPC ............ *H04L 49/103* (2013.01); *H04L 45/02* (2013.01); *H04L 45/121* (2013.01); *H04L 45/40* (2013.01); *H04L 47/28* (2013.01); *H04L 49/254* (2013.01)

(58) Field of Classification Search
CPC ....... H04L 45/02; H04L 45/40; H04L 49/103; H04L 45/121; H04L 47/28
(Continued)

(56) References Cited

U.S. PATENT DOCUMENTS

| | | | |
|---|---|---|---|
| 9,285,218 B2* | 3/2016 | Shekhar | G01C 21/3446 |
| 2004/0088392 A1* | 5/2004 | Barrett | G01C 21/26 |
| | | | 709/223 |

(Continued)

FOREIGN PATENT DOCUMENTS

| | | |
|---|---|---|
| JP | 6-243116 A | 9/1994 |
| JP | 2010-141443 A | 6/2010 |

(Continued)

OTHER PUBLICATIONS

Takada et al., "Development of Software Platform supporting a protocol for guaranteeing the real-time property of SpaceWire", Proceedings of the 57th Space Sciences and Technology Conference. (6 pages total).

*Primary Examiner* — John Pezzlo

(57) ABSTRACT

A communication management list generation device 20 generates a communication management list composed of communication management information including time of day information corresponding to a prescribed time of day and communication information indicating a communication process started at a prescribed time of day and not using the same path at the same time. The communication management list generation device is provided with: a determination means 21 for determining, regarding whether information on the communication process can be added to the (Continued)

communication information, each communication management information in descending order of time (early time first) corresponding to the time of day information; and an addition means 22 for adding information on the communication process to the communication information of the communication management information determined at a stage at which it was determined by the determination means 21 that addition is possible.

10 Claims, 27 Drawing Sheets

(51) Int. Cl.
    *H04L 12/721*     (2013.01)
    *H04L 12/841*     (2013.01)
    *H04L 12/937*     (2013.01)
    *H04L 12/751*     (2013.01)
    *H04L 12/727*     (2013.01)
    *H04J 1/16*     (2006.01)

(58) Field of Classification Search
    USPC .............................. 370/252, 238, 329, 389
    See application file for complete search history.

(56) References Cited

U.S. PATENT DOCUMENTS

| | | |
|---|---|---|
| 2010/0142545 A1 | 6/2010 | Kurita |
| 2011/0205890 A1 | 8/2011 | Kurita et al. |
| 2013/0197890 A1* | 8/2013 | Ide .................... G01C 21/3484 |
| | | 703/6 |
| 2013/0290336 A1* | 10/2013 | Moriguchi ............ G06F 16/285 |
| | | 707/737 |

FOREIGN PATENT DOCUMENTS

| | | |
|---|---|---|
| JP | 2011-176478 A | 9/2011 |
| JP | 2013-5080 A | 1/2013 |
| JP | 2014-236364 A | 12/2014 |

* cited by examiner

Fig. 12

| INPUT TERMINAL | INPUT PORT | OUTPUT TERMINAL | OUTPUT PORT |
|---|---|---|---|
| 11 | 1 | 17 | 9 |
| 11 | 1 | 18 | 9 |
| 11 | 1 | 19 | 9 |
| 12 | 1 | 17 | 9 |
| 12 | 1 | 18 | 9 |
| 12 | 1 | 19 | 9 |
| 13 | 1 | 17 | 9 |
| 13 | 1 | 18 | 9 |
| 13 | 1 | 19 | 9 |

Fig. 13

| ROUTE NAME | FIRST LINK | SECOND LINK | THIRD LINK | FOURTH LINK | FIFTH LINK | SIXTH LINK |
|---|---|---|---|---|---|---|
| path1 | [V(13)->V(3)@d=1] | [V(3)->V(5)@d=2] | [V(5)->V(7)@d=3] | [V(7)->V(17)@d=4] | | |
| path2 | [V(12)->V(2)@d=1] | [V(2)->V(4)@d=2] | [V(4)->V(7)@d=3] | [V(7)->V(17)@d=4] | | |
| path3 | [V(13)->V(3)@d=1] | [V(3)->V(6)@d=2] | [V(6)->V(8)@d=3] | [V(8)->V(18)@d=4] | | |
| path4 | [V(11)->V(1)@d=1] | [V(1)->V(2)@d=2] | [V(2)->V(4)@d=3] | [V(4)->V(7)@d=4] | [V(7)->V(17)@d=5] | |
| path5 | [V(12)->V(2)@d=1] | [V(2)->V(5)@d=2] | [V(5)->V(8)@d=3] | [V(8)->V(18)@d=4] | | |
| path6 | [V(13)->V(3)@d=1] | [V(3)->V(6)@d=2] | [V(6)->V(8)@d=3] | [V(8)->V(9)@d=4] | [V(9)->V(19)@d=5] | |
| path7 | [V(11)->V(1)@d=1] | [V(1)->V(3)@d=2] | [V(3)->V(6)@d=3] | [V(6)->V(8)@d=4] | [V(8)->V(18)@d=5] | |
| path8 | [V(12)->V(2)@d=1] | [V(2)->V(4)@d=2] | [V(4)->V(7)@d=3] | [V(7)->V(9)@d=4] | [V(9)->V(19)@d=5] | |
| path9 | [V(11)->V(1)@d=1] | [V(1)->V(3)@d=2] | [V(3)->V(5)@d=3] | [V(5)->V(7)@d=4] | [V(7)->V(9)@d=5] | [V(9)->V(19)@d=6] |

Fig. 14

| TIMESLOT | COMMUNICATION ROUTE |
|---|---|
| 0 | 11→1→3→5→7→9→19<br>12→2→5→8→18<br>13→3→5→7→17 |
| 1 | 13→3→6→8→18<br>12→2→4→7→17<br>11→1→2→4→7→17 |
| 2 | 13→3→6→8→9→19<br>11→1→3→6→8→18 |
| 3 | 12→2→4→7→9→19 |
| 4~9 | |

Fig. 16

| ROUTE NAME | FIRST LINK | SECOND LINK | THIRD LINK | FOURTH LINK | FIFTH LINK | SIXTH LINK |
|---|---|---|---|---|---|---|
| path9 | [V(11)->V(1)@d=1] | [V(1)->V(3)@d=2] | [V(3)->V(5)@d=3] | [V(5)->V(7)@d=4] | [V(7)->V(9)@d=5] | [V(9)->V(19)@d=6] |
| path8 | [V(12)->V(2)@d=1] | [V(2)->V(4)@d=2] | [V(4)->V(7)@d=3] | [V(7)->V(9)@d=4] | [V(9)->V(19)@d=5] | |
| path7 | [V(11)->V(1)@d=1] | [V(1)->V(3)@d=2] | [V(3)->V(6)@d=3] | [V(6)->V(8)@d=4] | [V(8)->V(18)@d=5] | |
| path6 | [V(13)->V(3)@d=1] | [V(3)->V(6)@d=2] | [V(6)->V(8)@d=3] | [V(8)->V(9)@d=4] | [V(9)->V(19)@d=5] | |
| path5 | [V(12)->V(2)@d=1] | [V(2)->V(5)@d=2] | [V(5)->V(8)@d=3] | [V(8)->V(18)@d=4] | | |
| path4 | [V(11)->V(1)@d=1] | [V(1)->V(2)@d=2] | [V(2)->V(4)@d=3] | [V(4)->V(7)@d=4] | [V(7)->V(17)@d=5] | |
| path3 | [V(13)->V(3)@d=1] | [V(3)->V(6)@d=2] | [V(6)->V(8)@d=3] | [V(8)->V(18)@d=4] | | |
| path2 | [V(12)->V(2)@d=1] | [V(2)->V(4)@d=2] | [V(4)->V(7)@d=3] | [V(7)->V(17)@d=4] | | |
| path1 | [V(13)->V(3)@d=1] | [V(3)->V(5)@d=2] | [V(5)->V(7)@d=3] | [V(7)->V(17)@d=4] | | |

Fig. 17

| TIMESLOT | COMMUNICATION ROUTE |
|---|---|
| 0 | 11→1→3→5→7→9→19<br>13→3→6→8→18<br>12→2→4→7→9→19 |
| 1 | 11→1→3→6→8→18<br>12→2→5→8→18 |
| 2 | 11→1→2→4→7→17<br>12→2→4→7→17 |
| 3 | 13→3→6→8→9→19 |
| 4 | 13→3→5→7→17 |
| 5～9 | |

Fig. 19

| TIMESLOT | COMMUNICATION ROUTE |
|---|---|
| 0 | 11→1→3→5→7→9→19<br>13→3→5→7→17<br>12→2→4→7→9→19 |
| 1 | 13→3→6→8→18<br>12→2→4→7→17<br>11→1→2→4→7→17 |
| 2 | 13→3→6→8→9→19<br>11→1→3→6→8→18<br>12→2→5→8→18 |
| 3~8 | |

Fig. 23

| TIMESLOT | COMMUNICATION ROUTE |
|---|---|
| 0 | 12→2→5→8→18<br>13→3→5→7→17 |
| 1 | 13→3→6→8→18<br>12→2→4→7→17<br>11→1→2→4→7→17 |
| 2 | 13→3→6→8→9→19<br>11→1→3→6→8→18 |
| 3 | 11→1→3→6→8→9→19<br>12→2→4→7→9→19 |
| 4~9 | |

Fig. 26

| TIMESLOT | COMMUNICATION ROUTE |
|---|---|
| 0 | 11→1→3→6→8→18<br>12→2→4→7→9→19 |
| 1~5 | |
| 6 | 11→1→3→6→8→9→19<br>12→2→5→8→18<br>13→3→5→7→17 |
| 7~12 | |
| 13 | 13→3→6→8→18<br>12→2→4→7→17 |
| 14~17 | |
| 18 | 13→3→6→8→9→19<br>11→1→2→4→7→17 |
| 19~24 | |

COMMUNICATION MANAGEMENT LIST GENERATION DEVICE, COMMUNICATION MANAGEMENT LIST GENERATION METHOD, AND STORAGE MEDIUM IN WHICH COMMUNICATION MANAGEMENT LIST GENERATION PROGRAM IS STORED

This application is a National Stage Entry of PCT/JP2016/004267 filed on Sep. 20, 2016, which claims priority from Japanese Patent Application 2015-202276 filed on Oct. 13, 2015, the contents of all of which are incorporated herein by reference, in their entirety.

TECHNICAL FIELD

The present invention relates to a communication management list generation device, a communication management list generation method, and a communication management list generation program, and particularly, to a communication management list generation device, a communication management list generation method, and a communication management list generation program for generating a time division schedule capable of performing efficient message transmission in a time division method in which a timing of transmitting a message is determined in advance.

BACKGROUND ART

There is a method called wormhole routing as a method for transferring data between nodes in a parallel computer or the like. For example, PTL 1 describes a communication control device using wormhole routing as an inter-processor communication method. Further, PTL 2 describes a router for performing wormhole routing and its transfer method.

In wormhole routing, a buffer corresponding to one packet is provided in each port of a switch. Alternatively, a buffer corresponding to one block (also called a flit) to be transferred may be provided.

When a buffer of a transmission destination port becomes empty, a next packet is transferred toward the transmission destination port. Specifically, in wormhole routing, only one packet or only one flit at most is allowed to pass through one link connecting between ports at one time.

In the following, communication processing to be performed by using wormhole routing is described with reference to FIG. 22. FIG. 22 is an explanatory diagram illustrating an example of communication processing to be performed by using wormhole routing. Note that, in order to simplify description, one packet is handled as one flit.

A circle illustrated in FIG. 22 indicates a switch, and a rectangle illustrated in FIG. 22 indicates a terminal, respectively. Each terminal and each switch include one port or a plurality of ports. Further, each terminal and each switch are communicably connected to another terminal or another switch via a link connecting between ports. One straight line connecting a circle and a rectangle, or one straight line connecting between circles in FIG. 22 corresponds to one link.

A communication network illustrated in FIG. 22 is constituted by a switch 1 to a switch 9, a terminal 11 to a terminal 13, a terminal 17 to a terminal 19, and links. Further, a numeral including a prefix p such as p1 illustrated in FIG. 22 indicates a port number of a port of each switch and each terminal.

In the communication network illustrated in FIG. 22, a case is considered in which the terminal 11 transmits a packet to the terminal 17, and the terminal 12 transmits a packet to the terminal 18 respectively at a predetermined start timing. In order to simplify description, it is assumed that a time required for each packet to pass through each link is identical.

The terminal 12 transmits a packet A in such a manner that the packet A passes a route "terminal 12→switch 2→switch 5→switch 8→terminal 18". A broken-lined arrow illustrated in FIG. 22 indicates movement of the packet A. Simultaneously, the terminal 11 transmits a packet B in such a manner that the packet B passes a route "terminal 11→switch 1→switch 2→switch 5→switch 7→terminal 17". A solid-lined arrow illustrated in FIG. 22 indicates movement of the packet B.

When each terminal transmits a packet as illustrated in FIG. 22, the packet A and the packet B try to simultaneously pass through a link between the switch 2 and the switch 5. However, since only one packet is allowed to pass through one link at one time in wormhole routing as described above, in the present example, one of the packets stops at the switch 2.

A phenomenon that a packet being transferred stops in the course of transfer as described above is referred to as blocking. FIG. 22 illustrates that blocking occurs on a link between the switch 2 and the switch 5.

When blocking occurs, since a packet is not transferred as scheduled, communication delay occurs. Further, when blocking occurs in a part of a communication network, another packet may also stop due to an influence of the packet that stops by blocking. Consequently, blocking occurs in a chain reaction manner in a whole communication network.

Occurrence of blocking, and chain-reaction occurrence of blocking are fatal matters in a system for which promptness is required, such as an embedded system. For example, when communication delay occurs in an artificial satellite or a vehicle-mounted control device, a serious accident may occur.

In order to prevent occurrence of blocking, it is conceived that an order of communication is determined when communication processing using wormhole routing is designed. In the following, a method for generating a timeslot list in order to prevent occurrence of blocking when packets fail to simultaneously pass through a same network link in a communication network including a wormhole routing mechanism is described.

FIG. 23 is an explanatory diagram illustrating an example of a timeslot list. The timeslot list illustrated in FIG. 23 is constituted by communication management information. The communication management information is constituted by timeslots and communication routes. A timeslot and a communication route which are included in a same piece of communication management information have a relationship that communication associated with the communication route is started at a time corresponding to the timeslot. Note that each numeral in a communication route is associated with a switch or a terminal illustrated in FIG. 22.

For example, when a communication packet for an application which is introduced within an own terminal is transmitted, the terminal requests a timeslot management device or the like to perform communication in which the communication packet is transmitted. The timeslot management device which also receives a request for performing communication from another terminal manages communication by generating a timeslot list as illustrated in FIG. 23.

In a communication network to be managed by a timeslot management device, communication is performed based on a timeslot list generated by the timeslot management device. In an example of the timeslot list illustrated in FIG. 23, when a request for performing communication associated with a communication route "terminal 12→switch 2→switch 5→switch 8→terminal 18" is received, communication associated with a time corresponding to a timeslot 0 is started. Further, when a request for performing communication associated with a communication route "terminal 13→switch 3→switch 5→switch 7→terminal 17" is also received, communication associated with a time corresponding to a timeslot 0 is started.

When a time corresponding to a timeslot 0 has passed, next time, communication is performed based on communication management information in which a timeslot is 1. When times corresponding to a timeslot 1 to a timeslot 3 come, and a request for performing communication associated with a communication route indicated in a timeslot list is received, communication associated with each of the times is respectively started.

In a case where the timeslot list illustrated in FIG. 23 is used, when a time corresponding to a timeslot 9 has passed, communication is performed again based on communication management information in which a timeslot is 0. As described above, an order of performing communication is defined in a timeslot list.

Note that, since communication to be started at a time corresponding to each timeslot is not allocated from communication management information in which a timeslot is 4 to communication management information in which a timeslot is 9, a communication route in each piece of the communication management information is empty. Also in a timeslot list other than the timeslot list illustrated in FIG. 23, communication is not allocated to communication management information in which a communication route is empty.

FIG. 24 illustrates use timings for each link by each piece of communication to be performed based on the timeslot list illustrated in FIG. 23. FIG. 24 is a time chart illustrating use timings for each link by communication to be performed based on the timeslot list illustrated in FIG. 23.

A horizontal axis of the time chart illustrated in FIG. 24 is a timeslot axis associated with a timeslot, specifically, a time. Further, a vertical axis of the time chart illustrated in FIG. 24 is a link axis associated with a link within a communication network. For example, "1→2" in the link axis of the time chart illustrated in FIG. 24 indicates a link between the switch 1 and the switch 2 within the communication network illustrated in FIG. 22.

Each polygonal line within the time chart illustrated in FIG. 24 is associated with each piece of communication to be performed based on the timeslot list illustrated in FIG. 23. For example, in a polygonal line indicated by marks □ illustrated in FIG. 24, a mark □ is indicated at an intersection of a timeslot 2 and a link "1→2".

The aforementioned mark □ indicates that communication associated with the polygonal line indicated by marks □ uses the link "1→2" during a period from a time corresponding to a timeslot 2 to a time corresponding to a timeslot 3. A diagram such as FIG. 24 is referred to as a time chart in the present specification. As described above, a time chart indicates a usage status of a communication link.

Other polygonal lines also indicate a content similar to the polygonal line indicated by marks □. As far as two or more marks are not indicated at a same position within a time chart, respective pieces of communication indicated in the time chart do not use a same link simultaneously. Specifically, blocking does not occur in respective pieces of communication indicated in a time chart.

A time when overall communication to be performed based on the timeslot list illustrated in FIG. 23 is finished is a time corresponding to a timeslot 9 being a time when communication using a link "switch 9→terminal 19" indicated by a mark x is finished, when referring to the time chart illustrated in FIG. 24.

The number of timeslots required until overall communication to be performed based on a timeslot list is completed is defined as a timeslot number of a timeslot list. Therefore, a timeslot number of the timeslot list illustrated in FIG. 23 is nine.

It is often the case that a timeslot list as illustrated in FIG. 23 is manually designed. However, a method for generating a timeslot list to be used in a wormhole routing network is also proposed. For example, NPL 1 describes a method for generating a timeslot list to be applied to a device.

FIG. 25 is a block diagram illustrating a configuration example of a timeslot list generation device described in NPL 1. As illustrated in FIG. 25, a timeslot list generation device 900 includes a shortest route generation means 910, a segment dividing means 920, and a segment timeslot allocation means 930.

As illustrated in FIG. 25, the shortest route generation means 910 receives network topology information and an endpoint pair list as an input. The endpoint pair list is constituted by endpoint pair information. Sets of inlet ports of a packet to be transferred by predetermined communication into a communication network, and outlet ports of the packet from the communication network are designated in the endpoint pair information.

The shortest route generation means 910 acquires a shortest route from an inlet port to an outlet port of each piece of communication by using network topology information and an endpoint pair list. Then, the shortest route generation means 910 generates a route list constituted by the acquired shortest routes.

Then, the segment dividing means 920 classifies routes within the route list generated by the shortest route generation means 910 into groups for each route which does not pass through a same link at all. A group of routes generated by the segment dividing means 920 is referred to as a segment.

Then, the segment timeslot allocation means 930 allocates one segment route to one piece of communication management information. FIG. 26 illustrates an example of a timeslot list to be generated by the timeslot list generation device 900. FIG. 26 is an explanatory diagram illustrating another example of the timeslot list. As described above, the respective routes allocated to a same piece of communication management information illustrated in FIG. 26 do not pass through a same link simultaneously.

Further, the segment timeslot allocation means 930 allocates each segment route as follows. First of all, the segment timeslot allocation means 930 allocates a first segment route to communication management information in which a timeslot is 0. As illustrated in FIG. 26, there are two routes allocated to communication management information in which a timeslot is 0.

Then, the segment timeslot allocation means 930 allocates a next segment route to communication management information of a timeslot succeeding to a timeslot corresponding to a time when overall communication associated with the previously allocated segment route is finished. A time when overall communication associated with routes allocated to communication management information in which a timeslot is 0 is finished corresponds to a timeslot 5.

Therefore, the segment timeslot allocation means 930 allocates a next segment route to communication management information in which a timeslot is 6. Likewise, the segment timeslot allocation means 930 allocates the remaining two segment routes to communication management information in which a timeslot is 13, and to communication management information in which a timeslot is 18, respectively.

Therefore, in a case of communication to be performed based on the timeslot list illustrated in FIG. 26, a communication group to be started during a same timeslot does not use a same link simultaneously. Further, other communication is not started until overall communication in a started communication group is finished. Therefore, when a timeslot list to be generated by a timeslot list generation device described in NPL 1 is used, communication free of blocking is performed.

FIG. 27 is a time chart illustrating use timings for each link by communication to be performed based on the timeslot list illustrated in FIG. 26. A time when overall communication to be performed based on the timeslot list illustrated in FIG. 26 is finished is a time corresponding to a timeslot 23, when referring to the time chart illustrated in FIG. 27. A time corresponding to a timeslot 23 is a time when communication using a link "switch 9→terminal 19" indicated by a mark ♦ in FIG. 27, and communication using a link "switch 7→terminal 17" indicated by a mark x in FIG. 27 are finished. Specifically, a timeslot number of the timeslot list illustrated in FIG. 26 is 23, which is larger than a timeslot number of the timeslot list illustrated in FIG. 23.

CITATION LIST

Patent Literature

[PTL 1] Japanese Laid-open Patent Publication No. H6-243116
[PTL 2] Japanese Laid-open Patent Publication No. 2013-005080

Non-Patent Literature

[NPL1] Mitsutaka TAKADA et al., "Development of Software Platform for Guaranteeing the Real-Time Property of SpaceWire", Proceedings of the 57th Space Sciences and Technology Conference

SUMMARY OF INVENTION

Technical Problem

When a communication network using wormhole routing is configured, it is important to design a timeslot list having a small timeslot number. A reason for this is that a timeslot number of the timeslot list illustrated in FIG. 23 is nine, for example. Therefore, when a terminal requests to perform communication, the terminal may be required to wait for a time corresponding to nine timeslots maximally before communication is performed.

Further, a timeslot number of the timeslot list illustrated in FIG. 26 is 23. Therefore, when a terminal requests to perform communication, the terminal may be required to wait for a time corresponding to 23 timeslots maximally before communication is performed. Specifically, when a timeslot list having a large timeslot number is used, it is presumed that an average standby time increases, and a longer time is required for performing communication. Thus, it is considered that communication may not be performed efficiently.

Although communication routes as a generation source are the same, a timeslot number of the timeslot list illustrated in FIG. 23 is nine, and a timeslot number of the timeslot list illustrated in FIG. 26 is 23, respectively, which are different from each other. Specifically, a problem in the method described in NPL 1 is that a timeslot number of a timeslot list to be generated may increase.

A reason for this is that, in the method described in NPL 1, communication routes are divided into segments. Routes belonging to a same segment are allocated to a same piece of communication management information. Further, routes of each segment are allocated to each piece of communication management information in such a manner that a communication group associated with a next segment is not started until overall communication in a communication group associated with a previous segment is completed.

Specifically, routes belonging to another segment are not allocated to communication management information associated with a time zone during which communication associated with routes belonging to one segment is performed, and performing communication respectively associated with a plurality of segments in a same time zone is not allowed.

As illustrated in FIG. 27, a multitude of links through which a communication packet does not pass during a period when communication associated with each segment is performed are present within a communication network. Therefore, when a timeslot list generated by the method described in NPL 1 is used, it is highly likely that communication is performed inefficiently.

As described above, a method for generating a timeslot list with which communication is performed at a shorter time interval is required, as a method for generating a timeslot list to be generated in order to prevent blocking in communication processing using wormhole routing.

In view of the above, an object of the present invention is to provide a communication management list generation device, a communication management list generation method, and a communication management list generation program capable of generating a timeslot list with which communication free of blocking is performed at a shorter time interval.

Solution to Problem

A communication management list generation device, according to the present invention, for generating a communication management list constituted by communication management information including time information associated with a predetermined time, and communication information indicating communication processing which is started at the predetermined time and which does not use a same route simultaneously, the communication management list generation device includes: a determination means for determining each piece of communication management information in an ascending order of time associated with the time information regarding whether or not communication processing information is addable to communication information; and an addition means for adding the communication processing information to communication information of communication management information which is determined to be addable at a time of determination by the determination means.

A communication management list generation method, according to the present invention, to be performed in a communication management list generation device for generating a communication management list constituted by communication management information including time information associated with a predetermined time, and communication information indicating communication processing which is started at the predetermined time and which does not use a same route simultaneously, the communication management list generation method includes: determining each piece of communication management information in an ascending order of time associated with the time information regarding whether or not communication processing information is addable to communication information; and adding the communication processing information to communication information of communication management information which is determined to be addable at a time of determination.

A communication management list generation program, according to the present invention, to be performed by a computer which generates a communication management list constituted by communication management information including time information associated with a predetermined time, and communication information indicating communication processing which is started at the predetermined time and which does not use a same route simultaneously, the communication management list generation program causing the computer to execute: determination processing of determining each piece of communication management information in an ascending order of time associated with the time information regarding whether or not communication processing information is addable to communication information; and addition processing of adding the communication processing information to communication information of communication management information which is determined to be addable at a time of determination in the determination processing.

Advantageous Effects of Invention

According to the present invention, it is possible to generate a timeslot list with which communication free of blocking is performed at a shorter time interval.

BRIEF DESCRIPTION OF DRAWINGS

FIG. 12 is an explanatory diagram illustrating an example of an endpoint pair list to be input to a shortest sparse route generation means 110 in the fourth example embodiment.

FIG. 13 is an explanatory diagram illustrating an example of a route list to be generated by the shortest sparse route generation means 110 in the fourth example embodiment.

FIG. 14 is an explanatory diagram illustrating an example of a timeslot list to be generated by a timeslot allocation means 120 in the fourth example embodiment.

FIG. 16 is an explanatory diagram illustrating an example of a rearranged route list to be generated by a descending order distance route rearranging means 130 in the fourth example embodiment.

FIG. 17 is an explanatory diagram illustrating another example of a timeslot list to be generated by the timeslot allocation means 120 in the fourth example embodiment.

FIG. 19 is an explanatory diagram illustrating an example of a timeslot list to be generated by a comprehensive timeslot allocation means 140 in the fourth example embodiment.

FIG. 23 is an explanatory diagram illustrating an example of a timeslot list.

FIG. 26 is an explanatory diagram illustrating another example of a timeslot list.

EXAMPLE EMBODIMENT

First Example Embodiment

[Description on Configuration]

In the following, an example embodiment of the present invention is described with reference to the drawings. FIG.

1 is a block diagram illustrating a configuration example of a first example embodiment of a timeslot list generation device 100 according to the present invention. The timeslot list generation device 100 is, for example, a timeslot list generation device for generating a timeslot list to be used when communication using wormhole routing is performed in such a manner that blocking does not occur in communication.

Figure 1:
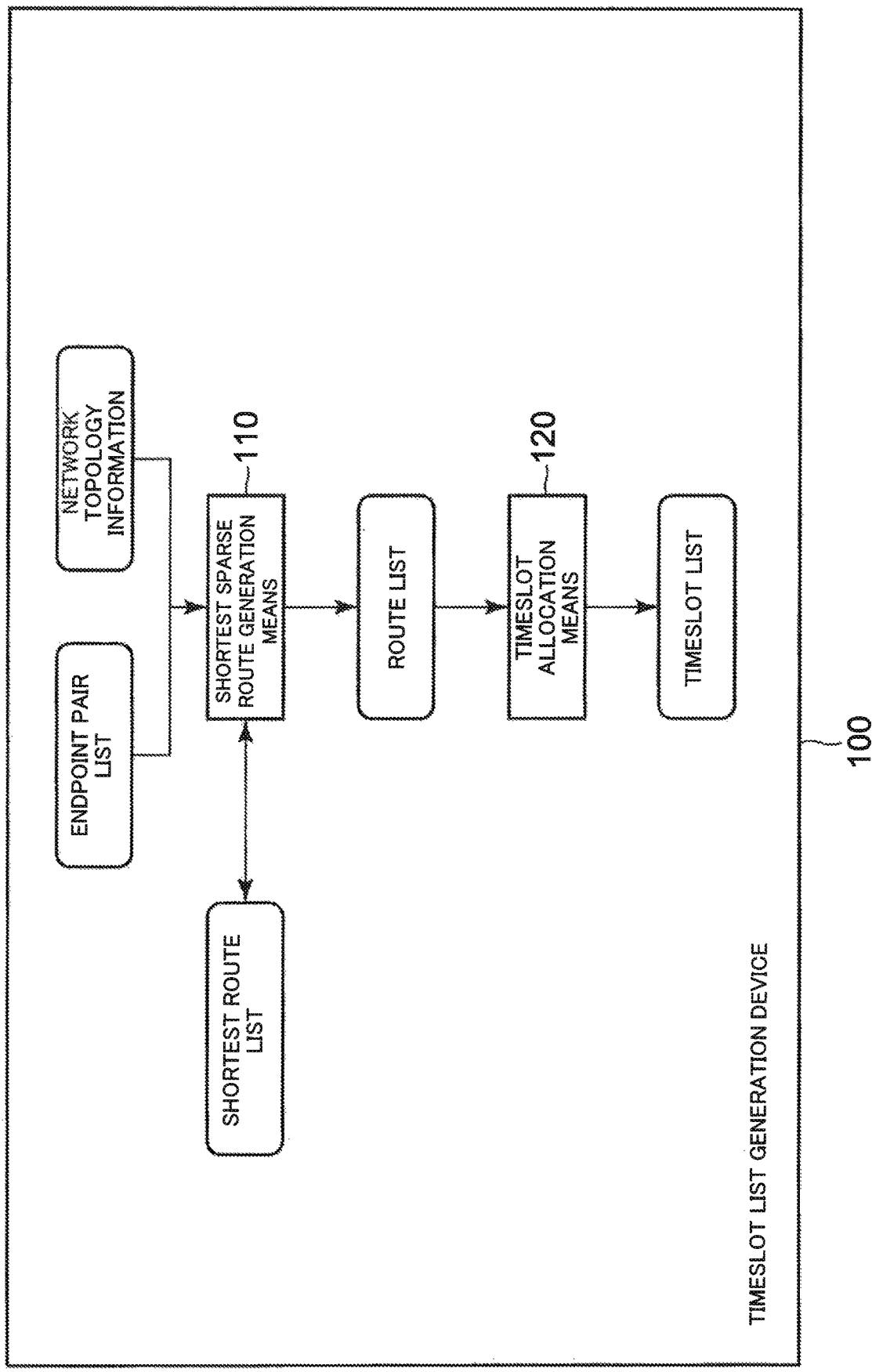
FIG. 1 is a block diagram illustrating a configuration example of a first example embodiment of a timeslot list generation device 100 according to the present invention.

The timeslot list generation device 100 illustrated in FIG. 1 includes a shortest sparse route generation means 110 and a timeslot allocation means 120.

As illustrated in FIG. 1, the shortest sparse route generation means 110 receives network topology information and an endpoint pair list as an input. The shortest sparse route generation means 110 calculates a shortest route, within a communication network, connecting a start point and a finish point indicated by endpoint pair information constituting an endpoint pair list for each piece of endpoint pair information.

Then, the shortest sparse route generation means 110 generates a route list constituted by the calculated shortest routes. Routes included in the route list do not pass through a same link within a communication network during a same time zone as much as possible.

The timeslot allocation means 120 allocates, by using the route list as an input, a route to each piece of communication management information having a different timeslot in such a manner that routes included in a route list do not overlap each other. Note that an expression that routes do not overlap each other means that the respective routes do not pass through a same link within a communication network during a same time zone. The timeslot allocation means 120 outputs a timeslot list, in which routes within an allocatable route list are all allocated.

[Description on Operation]

Figure 2:
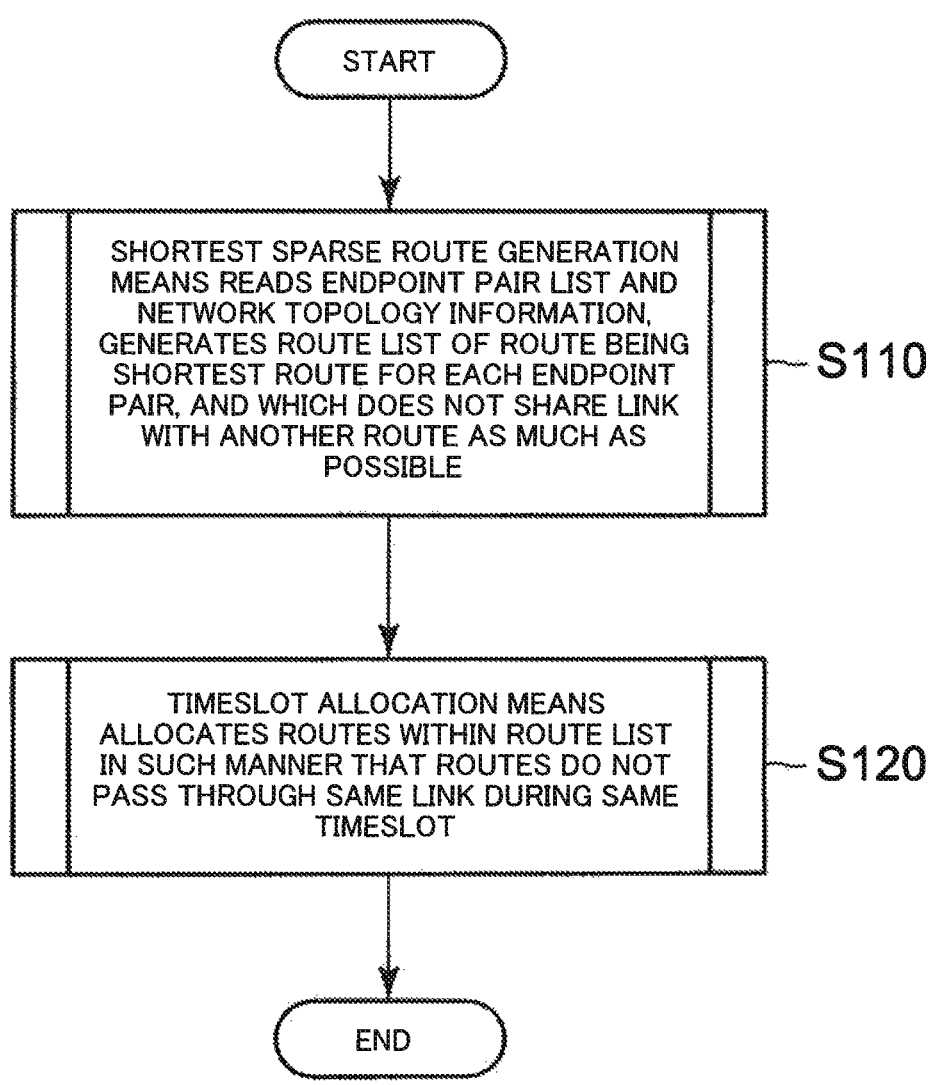
FIG. 2 is a flowchart illustrating an operation of generation processing by the timeslot list generation device 100 in the first example embodiment.

In the following, an operation of the timeslot list generation device 100 in the present example embodiment is described with reference to FIG. 2. FIG. 2 is a flowchart illustrating an operation of generation processing by the timeslot list generation device 100 in the first example embodiment.

The shortest sparse route generation means 110 receives an endpoint pair list and network topology information as an input. Then, the shortest sparse route generation means 110 generates a route list constituted by shortest routes associated with respective pieces of endpoint pair information (Step S110).

Then, the timeslot allocation means 120 allocates routes within the route list to communication management information in such a manner that the routes do not pass through a same link during a same time zone (Step S120). The timeslot allocation means 120 outputs a timeslot list, in which allocatable routes within the route list are all allocated. After outputting the timeslot list, the timeslot list generation device 100 terminates the generation processing.

Figure 3:
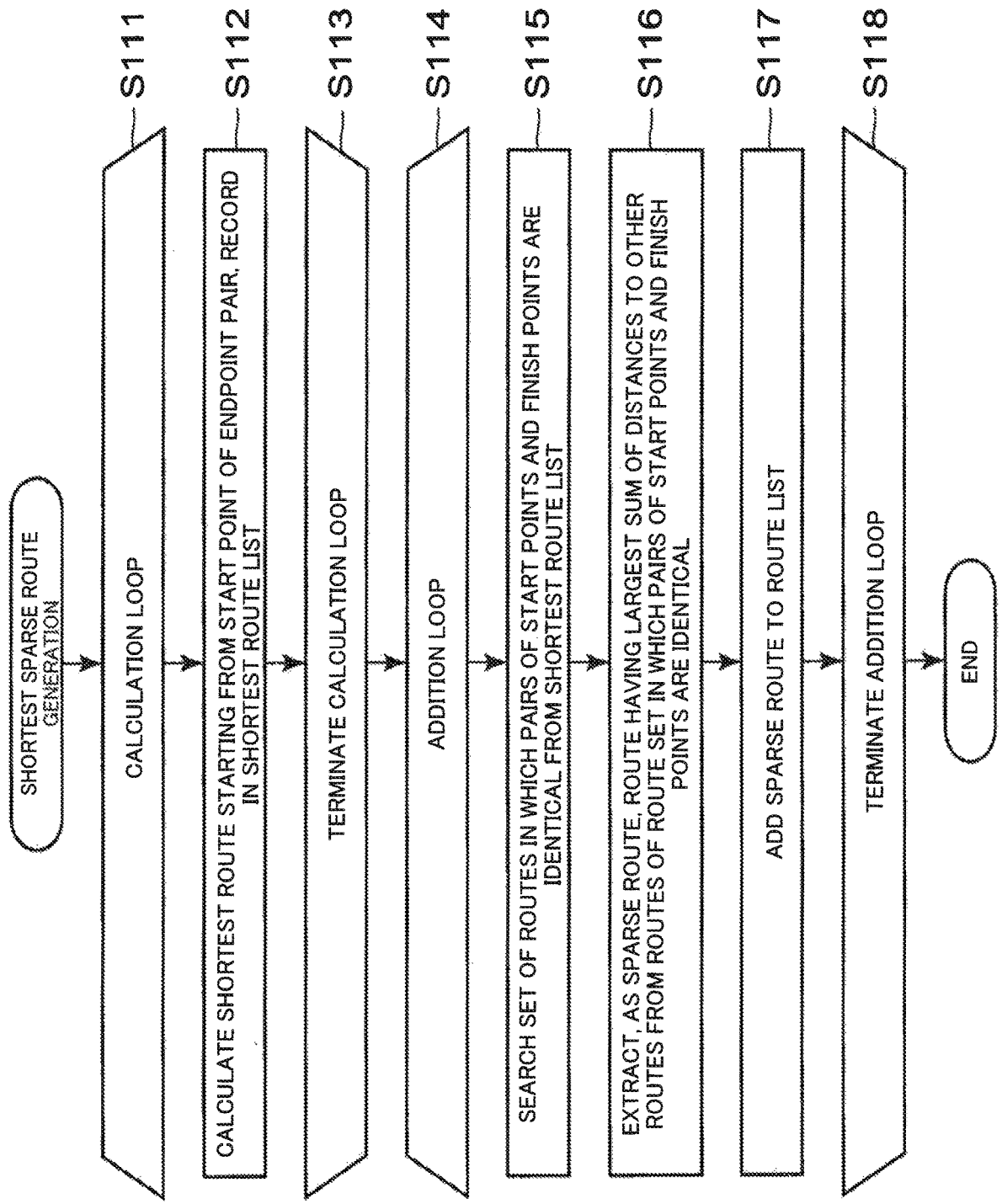
FIG. 3 is a flowchart illustrating an operation of route list generation processing by a shortest sparse route generation means 110.

In the following, an operation of the shortest sparse route generation means 110 in the present example embodiment is described with reference to FIG. 3. FIG. 3 is a flowchart illustrating an operation of route list generation processing by the shortest sparse route generation means 110. Specifically, processing of Step S111 to Step S118 illustrated in FIG. 3 corresponds to processing of Step S110 illustrated in FIG. 2.

The shortest sparse route generation means 110 receives an endpoint pair list and network topology information as an input. Specifically, the shortest sparse route generation means 110 enters a calculation loop (Step S111).

Then, the shortest sparse route generation means 110 calculates a shortest route from a start point to a finish point indicated by endpoint pair information within the input endpoint pair list. Note that a shortest route may be calculated by a well-known method, for example, and a plurality of shortest routes may be calculated. The shortest sparse route generation means 110 adds the calculated shortest route in a shortest route list stored in a working area (Step S112).

The shortest sparse route generation means 110 repeats processing of Step S112 during a period when a start point of endpoint pair information for which a shortest route is not calculated within the input endpoint pair list is present. When shortest routes from all start points of endpoint pair information within the endpoint pair list are calculated, the shortest sparse route generation means 110 exits from the calculation loop (Step S113).

Then, the shortest sparse route generation means 110 receives an endpoint pair list and a shortest route list as an input. Specifically, the shortest sparse route generation means 110 enters an addition loop (Step S114).

The shortest sparse route generation means 110 searches a set of routes, in which pairs of start points and finish points are identical, from routes within the input shortest route list (Step S115).

Figure 4:
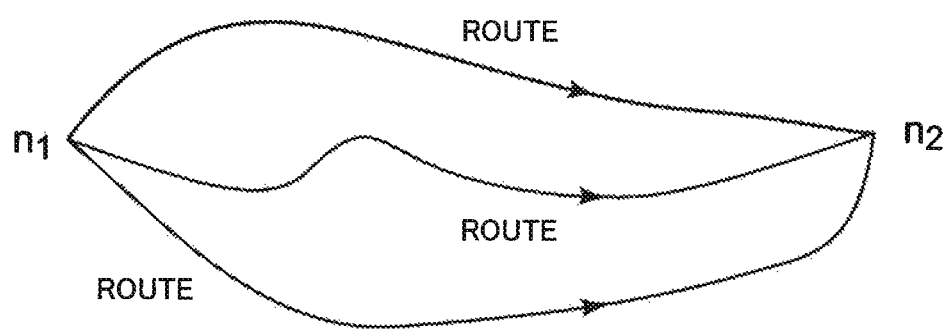
FIG. 4 is an explanatory diagram illustrating an example of a set of routes, in which pairs of start points and finish points are identical.

FIG. 4 is an explanatory diagram illustrating an example of a set of routes, in which pairs of start points and finish points are identical. In an example illustrated in FIG. 4, start points of arbitrary routes included in a set are all n1, and finish points of the arbitrary routes are all n2.

Then, the shortest sparse route generation means 110 acquires a route, in which a sum of distances to other routes within the shortest route list is largest, from the set of routes acquired in Step S115, and sets the acquired route as a sparse route (Step S116). A distance d(p1, p2) between a route p1 and a route p2 is defined as expressed by the following Eq. (1).

$$d(p1,p2) ::= \max(|p1|,|p2|) - \text{overlap}(p1,p2) \qquad \text{Eq. (1)}$$

In Eq. (1), p denotes a route, and |p| denotes the number of nodes through which the route p passes, specifically, a route length. Further, max(|p1|, |p2|) in Eq. (1) denotes a longer route length between the route length of |p1| and the route length of |p2|. Further, overlap(p1, p2) in Eq. (1) denotes the number of links through which p1 and p2 pass from a start point in a same distance, and is defined as expressed by the following Eq. (2).

$$\text{overlap}(p1,p2) ::= |\{p1[i]=p2[i] | 0<=i<\min(|p1|,|p2|)\}| \qquad \text{Eq. (2)}$$

In Eq. (2), p[i] denotes a node through which the route p passes in the i-th order. p[0] denotes a start node, and p[|p|−1] denotes a finish node. Further, in Eq. (2), min(|p1|, |p2|) denotes a shorter route length between the route length of |p1| and the route length of |p2|.

For example, a case is considered in which the route p1 and the route p2 are defined as follows.

$$p1 ::= n1 \rightarrow n2 \rightarrow n3 \rightarrow n5 \rightarrow n6$$

$$p2 ::= n1 \rightarrow n2 \rightarrow n4 \rightarrow n3 \rightarrow n5$$

In the aforementioned case, the route p1 and the route p2 pass through the same link "n1→n2" from a start point in a distance 0. Since no other common link to pass through is present, overlap(p1, p2)=2. Specifically, {p1[i]=p2[i] |0<=i<min(|p1|, |p2|)} indicates a set of common physical links through which the route p1 and the route p2 pass from a start point in a same distance i.

A sum of distances between a route calculated in Step S116 and other routes within the shortest route list is a value indicated by $\Sigma d(p, p_k)$, for example. The shortest sparse route generation means 110 acquires a route at which $\Sigma d(p, p_k)$ becomes maximum, and adds the acquired route in the route list, as a sparse route (Step S117).

The shortest sparse route generation means 110 repeats processing of Step S115 to Step S117 during a period when endpoint pair information for which a sparse route is not added within the input endpoint pair list is present. When sparse routes of all pieces of endpoint pair information within the endpoint pair list are added, the shortest sparse route generation means 110 exits from the addition loop (Step S118), and terminates the route list generation processing.

Figure 5:
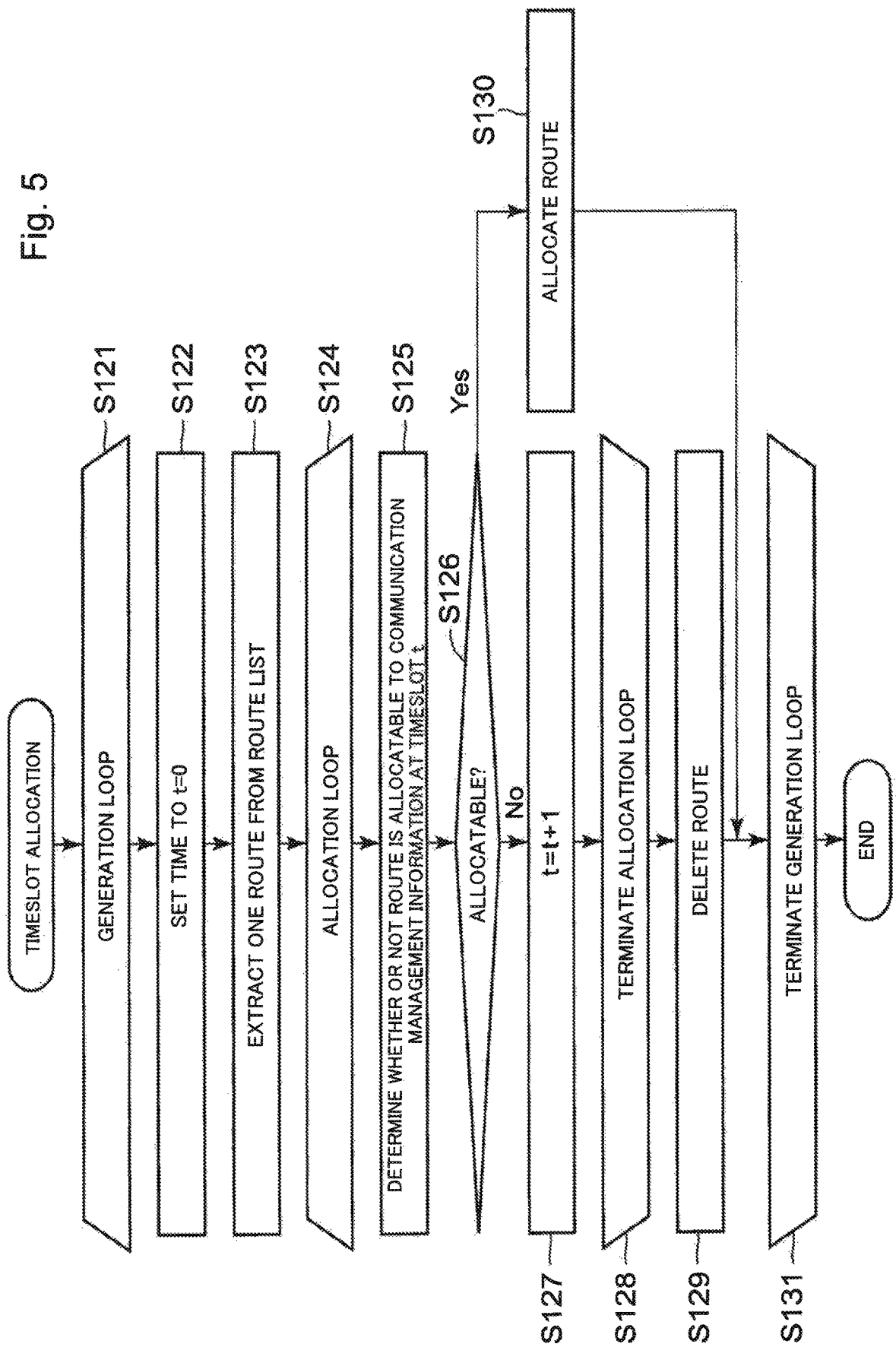
FIG. 5 is a flowchart illustrating an operation of timeslot list generation processing by a timeslot allocation means 120.

Next, an operation of the timeslot allocation means 120 in the present example embodiment is described with reference to FIG. 5. FIG. 5 is a flowchart illustrating an operation of timeslot list generation processing by the timeslot allocation means 120. Specifically, processing of Step S121 to Step S131 illustrated in FIG. 5 corresponds to processing of Step S120 illustrated in FIG. 2.

The timeslot allocation means 120 receives a route list generated by the shortest sparse route generation means 110 as an input. Specifically, the timeslot allocation means 120 enters a generation loop (Step S121).

Then, the timeslot allocation means 120 sets a timeslot allocation time t to 0 (Step S122). The timeslot allocation time t is a value associated with a timeslot of communication management information. Then, the time slot allocation means 120 extracts one route from the input route list (Step S123). Specifically, the timeslot allocation means 120 enters an allocation loop (Step S124).

The timeslot allocation means 120 determines whether or not a route extracted in Step S123 is allocatable to communication management information at the time t (Step S125). When the extracted route does not pass through a same link during a same time zone as a communication route of communication management information at the time t within the timeslot list, the timeslot allocation means 120 determines that the route is allocatable.

When it is determined that the route is not allocatable (No in Step S126), the timeslot allocation means 120 adds 1 to the timeslot allocation time t (Step S127). Then, the timeslot allocation means 120 performs processing of Step S125 again.

When it is determined that the route is allocatable (Yes in Step S126), the timeslot allocation means 120 allocates the route extracted in Step S123 to communication management information at the time t (Step S130). Then, the timeslot allocation means 120 performs processing of Step S122 again.

The timeslot allocation means 120 repeats processing of Step S125 to Step S127 until the timeslot allocation time t reaches an upper limit. When the timeslot allocation time t reaches the upper limit, the timeslot allocation means 120 exits from the allocation loop (Step S128), and deletes the route extracted in Step S123 (Step S129).

Note that the timeslot allocation means 120 may not delete a route extracted in Step S123, and may store the route in a working area. After deletion, the timeslot allocation means 120 performs processing of Step S122 again.

The upper limit of the timeslot allocation time t is a constant to be given from a user of the timeslot list generation device 100, for example. The upper limit of the timeslot allocation time t is determined for each target communication network.

The timeslot allocation means 120 repeats processing of Step S122 to Step S130 during a period when a route which is not processed within an input route list is present, specifically, until the input route list becomes empty. When all routes within the route list are processed, the timeslot allocation means 120 exits from the generation loop (Step S131), and terminates the timeslot list generation processing.

[Description on Advantageous Effects]

Next, advantageous effects of the present example embodiment are described. In the timeslot list generation device of the present example embodiment, the shortest sparse route generation means generates a route group in such a manner that a same link is not used for two or more pieces of communication during a same period as much as possible, and the timeslot allocation means allocates routes which do not pass through a same link simultaneously to same communication management information from the route group.

When routes are allocated, the timeslot allocation means allocates the routes in an order from communication management information having a small timeslot so that the routes are allocated to communication management information having a less number of route groups as small as possible. Thus, the timeslot list generation device is able to generate a timeslot list with which communication is performed at a shorter time interval. By using the generated timeslot list, larger communication is performed within a shorter period.

When a timeslot list generated by a method described in NPL 1 is used, since there is no time zone during which execution times overlap between pieces of communication of each segment, a large number of links which are not used in communication are present.

The timeslot list generation device in the present example embodiment does not divide communication routes into segments. Further, the timeslot allocation means in the present example embodiment is also able to allocate each communication route to communication management information, in which a communication route within a timeslot list remains empty. Therefore, by using the timeslot list generated in the present example embodiment, a time zone during which execution times overlap between pieces of communication is present, and larger communication is performed within a shorter period.

Second Example Embodiment

[Description on Configuration]

Figure 6:
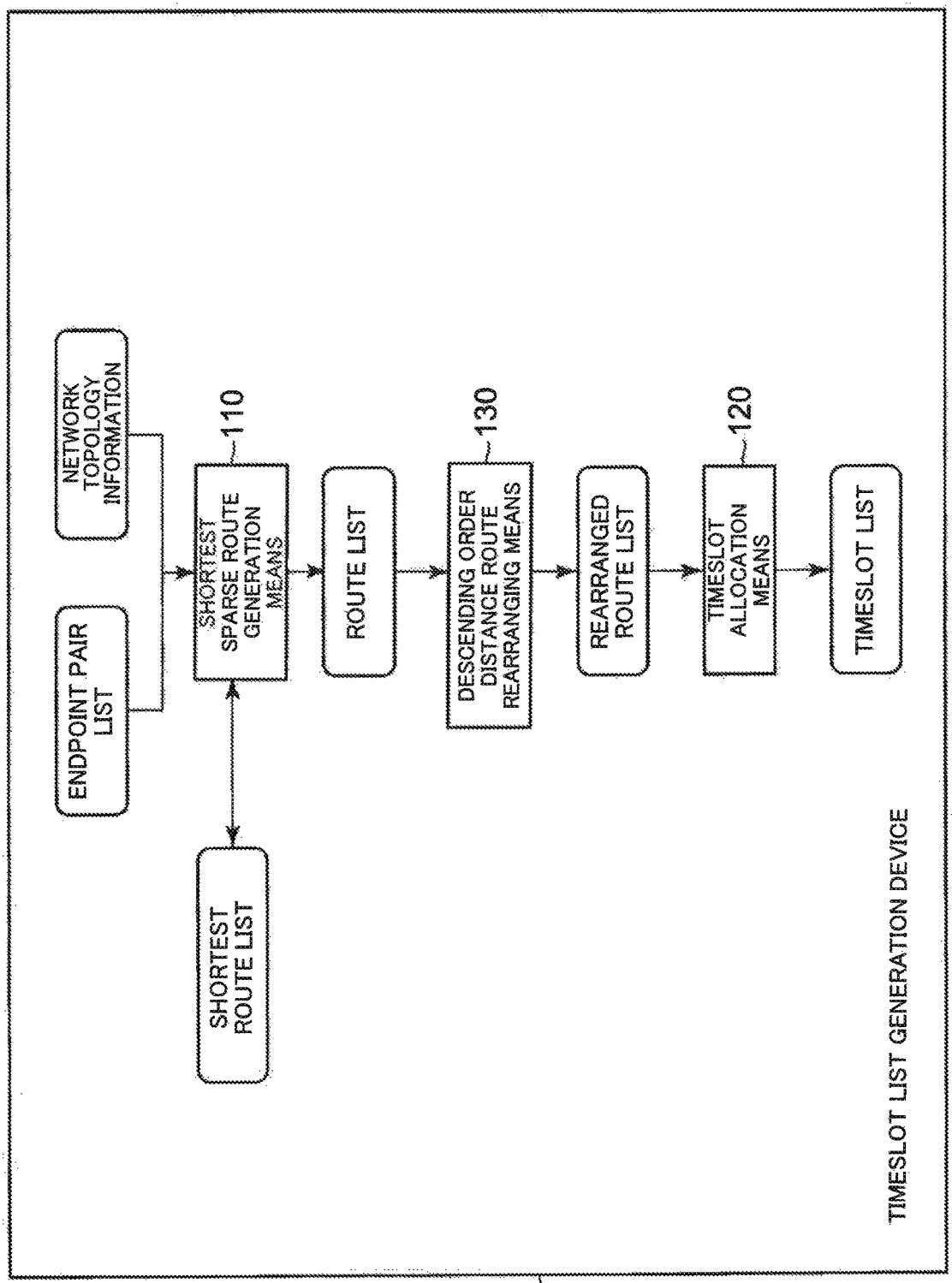
FIG. 6 is a block diagram illustrating a configuration example of a second example embodiment of a timeslot list generation device 100 according to the present invention.

Next, a second example embodiment of the present invention is described with reference to the drawings. FIG. 6 is a block diagram illustrating a configuration example of the second example embodiment of a timeslot list generation device 100 according to the present invention.

The timeslot list generation device 100 illustrated in FIG. 6 includes a shortest sparse route generation means 110, a timeslot allocation means 120, and a descending order distance route rearranging means 130. Unlike the timeslot list generation device 100 illustrated in FIG. 1, the timeslot list generation device 100 in the present example embodiment includes the descending order distance route rearranging means 130.

The descending order distance route rearranging means 130 receives a route list generated by the shortest sparse route generation means 110 as an input. The descending order distance route rearranging means 130 calculates a sum of distances between a route within the route list and other routes. Then, the descending order distance route rearranging means 130 rearranges the routes within the route list in the descending order of sum of distances, and generates a new route list, in which the routes are rearranged.

By rearranging the routes within the route list by the descending order distance route rearranging means 130 in the descending order of sum of distances, the timeslot allocation means 120 is able to allocate routes to communication management information in an order from a route having a small amount of overlapping with other routes. Thus, it is easy to allocate routes having a small amount of overlapping with respect to other routes to same communication management information, and a possibility that a timeslot number of a timeslot list to be generated is reduced increases, as compared with the first example embodiment.

[Description on Operation]

Figure 7:
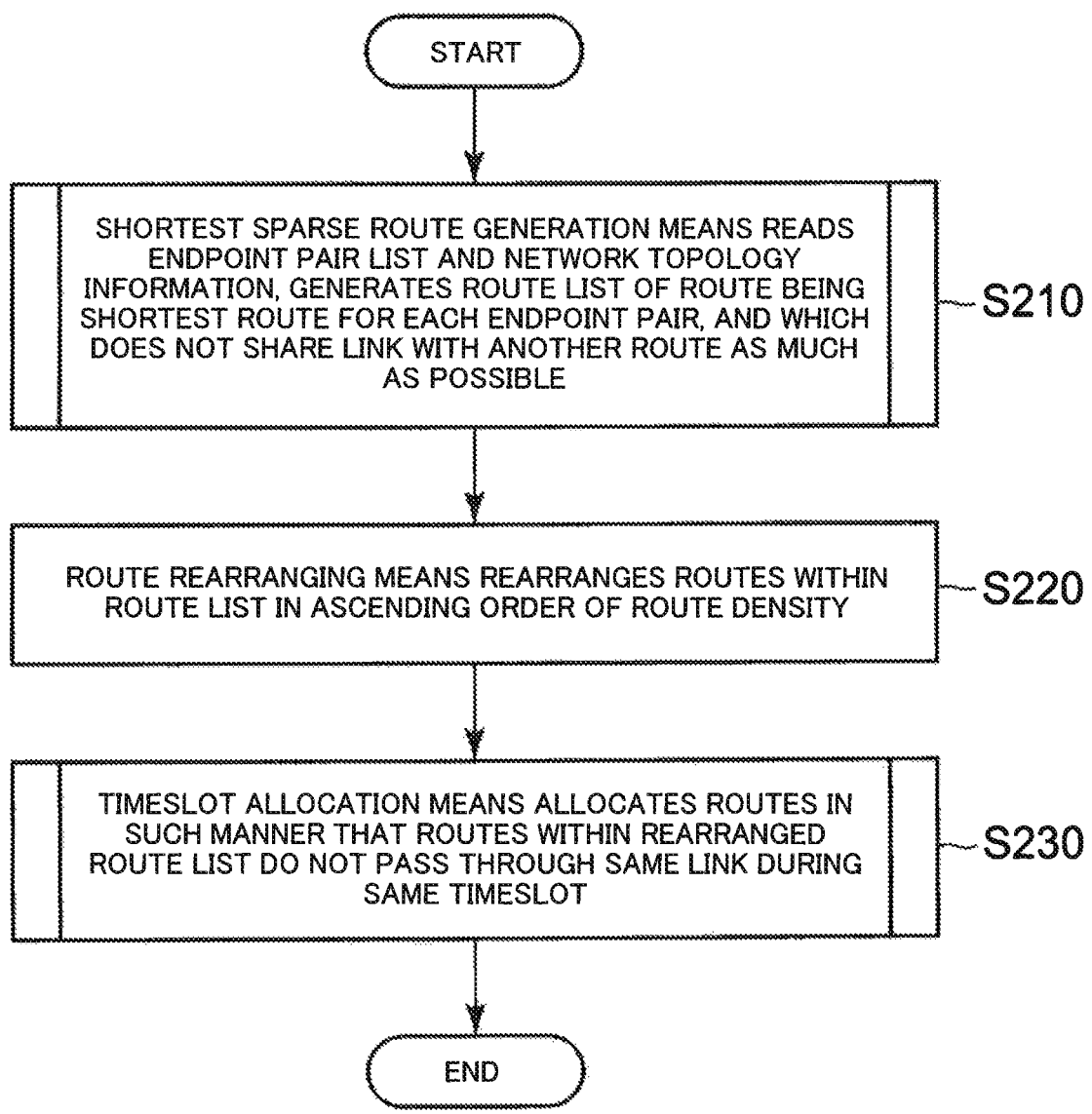
FIG. 7 is a flowchart illustrating an operation of generation processing by the timeslot list generation device 100 in the second example embodiment.

In the following, an operation of the timeslot list generation device 100 in the present example embodiment is described with reference to FIG. 7. FIG. 7 is a flowchart illustrating an operation of generation processing by the timeslot list generation device 100 in the second example embodiment.

The shortest sparse route generation means 110 receives an endpoint pair list and network topology information as an input. Then, the shortest sparse route generation means 110 generates a route being a shortest route connecting between endpoints, and which does not pass through a same link simultaneously with another route as much as possible for each piece of endpoint pair information within the endpoint pair list.

Then, the shortest sparse route generation means 110 outputs a route list constituted by the generated routes (Step S210). Note that processing of Step S210 is the same as processing of Step S110 illustrated in FIG. 2.

Then, the descending order distance route rearranging means 130 rearranges the routes within the route list output by the shortest sparse route generation means 110 in the descending order of sum of distances to other routes (Step S220). The descending order distance route rearranging means 130 outputs a route list, in which the routes are rearranged.

Then, the timeslot allocation means 120 allocates routes within the route list output by the descending order distance route rearranging means 130 to communication management information in such a manner that the routes do not pass through a same link during a same time zone (Step S230). Since routes are rearranged in the descending order of sum of distances to other routes in the route list, the timeslot allocation means 120 is able to allocate the routes to communication management information in an order from a route having a small amount of overlapping with other routes. The timeslot allocation means 120 outputs a timeslot list, in which allocatable routes within the route list are all allocated.

Note that processing of Step S230 is the same as processing of Step 120 illustrated in FIG. 2. After outputting a timeslot list, the timeslot list generation device 100 terminates the generation processing.

[Description on Advantageous Effects]

Next, advantageous effects of the present example embodiment are described. The descending order distance route rearranging means in the present example embodiment rearranges routes within a route list in the descending order of sum of distances to other routes. Therefore, the timeslot allocation means is able to allocate routes in an order from a route having a small amount of overlapping with other routes by using a rearranged route list as an input. Since it is easy to allocate a route having a small amount of overlapping with other routes to same communication management information, the timeslot list generation device in the present example embodiment provides an advantageous effect that it is possible to more advantageously reduce a timeslot number of a timeslot list to be generated, in addition to the advantageous effects of the first example embodiment.

Third Example Embodiment

[Description on Configuration]

Figure 8:
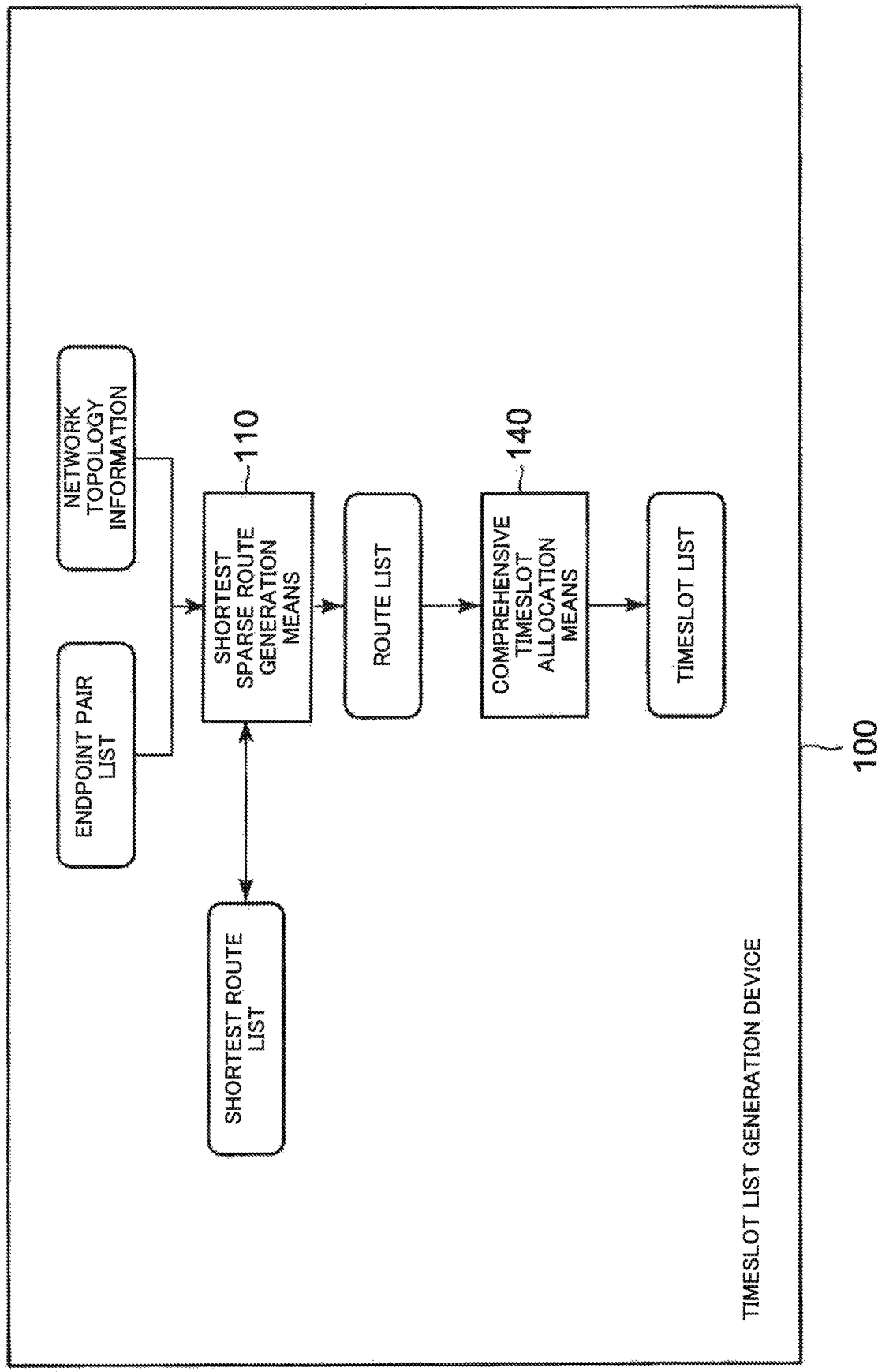
FIG. 8 is a block diagram illustrating a configuration example of a third example embodiment of a timeslot list generation device 100 according to the present invention.

Next, a third example embodiment of the present invention is described with reference to the drawings. FIG. 8 is a block diagram illustrating a configuration example of the third example embodiment of a timeslot list generation device 100 according to the present invention.

The timeslot list generation device 100 illustrated in FIG. 8 includes a shortest sparse route generation means 110 and a comprehensive timeslot allocation means 140. Unlike the timeslot list generation device 100 illustrated in FIG. 1, the timeslot list generation device 100 in the present example embodiment includes the comprehensive timeslot allocation means 140 in place of the timeslot allocation means 120.

The comprehensive timeslot allocation means 140 has a function of the timeslot allocation means 120. Further, the comprehensive timeslot allocation means 140 also has a function of determining a timeslot list having a smallest timeslot number among all generatable timeslot lists.

[Description on Operation]

Figure 9:
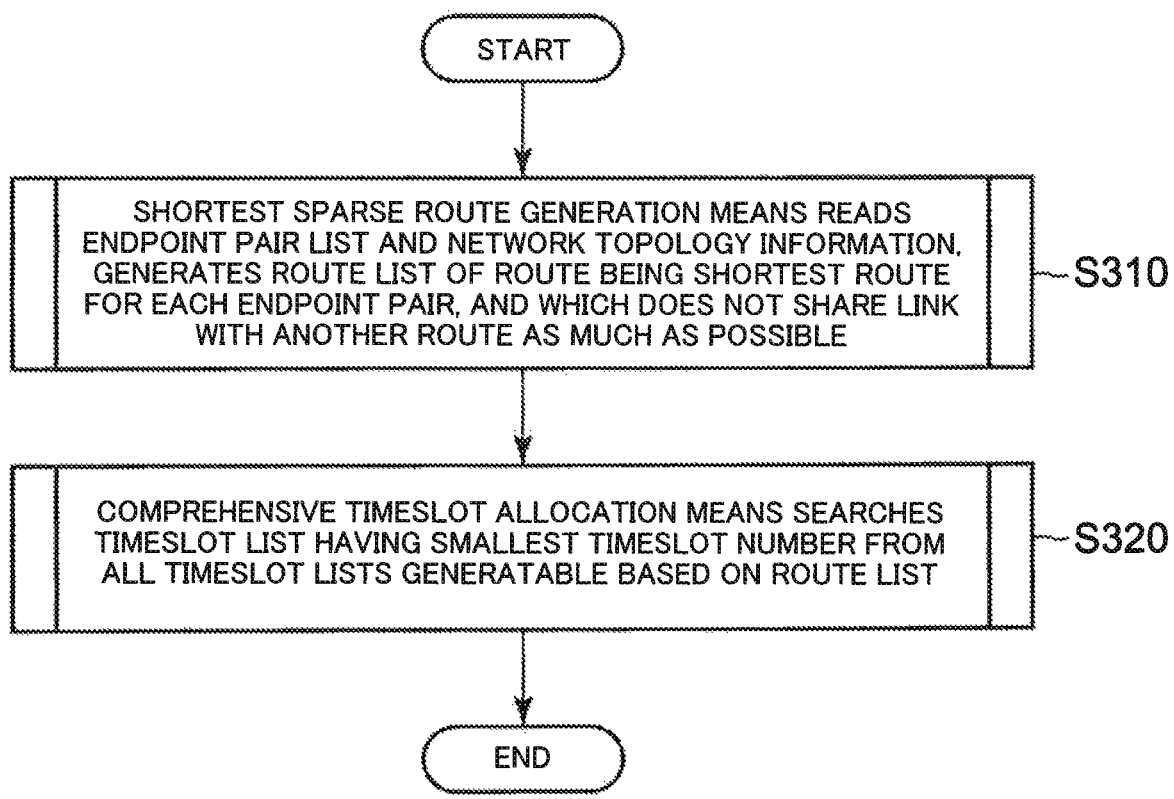
FIG. 9 is a flowchart illustrating an operation of generation processing by the timeslot list generation device 100 in the third example embodiment.

In the following, an operation of the timeslot list generation device 100 in the present example embodiment is described with reference to FIG. 9. FIG. 9 is a flowchart illustrating an operation of generation processing by the timeslot list generation device 100 in the third example embodiment.

The shortest sparse route generation means 110 receives an endpoint pair list and network topology information as an input. Then, the shortest sparse route generation means 110 generates a route being a shortest route connecting between endpoints, and which does not pass through a same link simultaneously with another route as much as possible for each piece of endpoint pair information within the endpoint pair list.

The shortest sparse route generation means 110 outputs a route list constituted by the generated routes (Step S310). Note that processing of Step S310 is the same as processing of Step 110 illustrated in FIG. 2.

Then, the comprehensive timeslot allocation means 140 calculates timeslot numbers of all timeslot lists generatable based on the routes within the route list, respectively, and determines a timeslot list having a smallest timeslot number (Step S320).

Then, the comprehensive timeslot allocation means 140 outputs the determined timeslot list. After outputting the timeslot list, the timeslot list generation device 100 terminates the generation processing.

Figure 10:
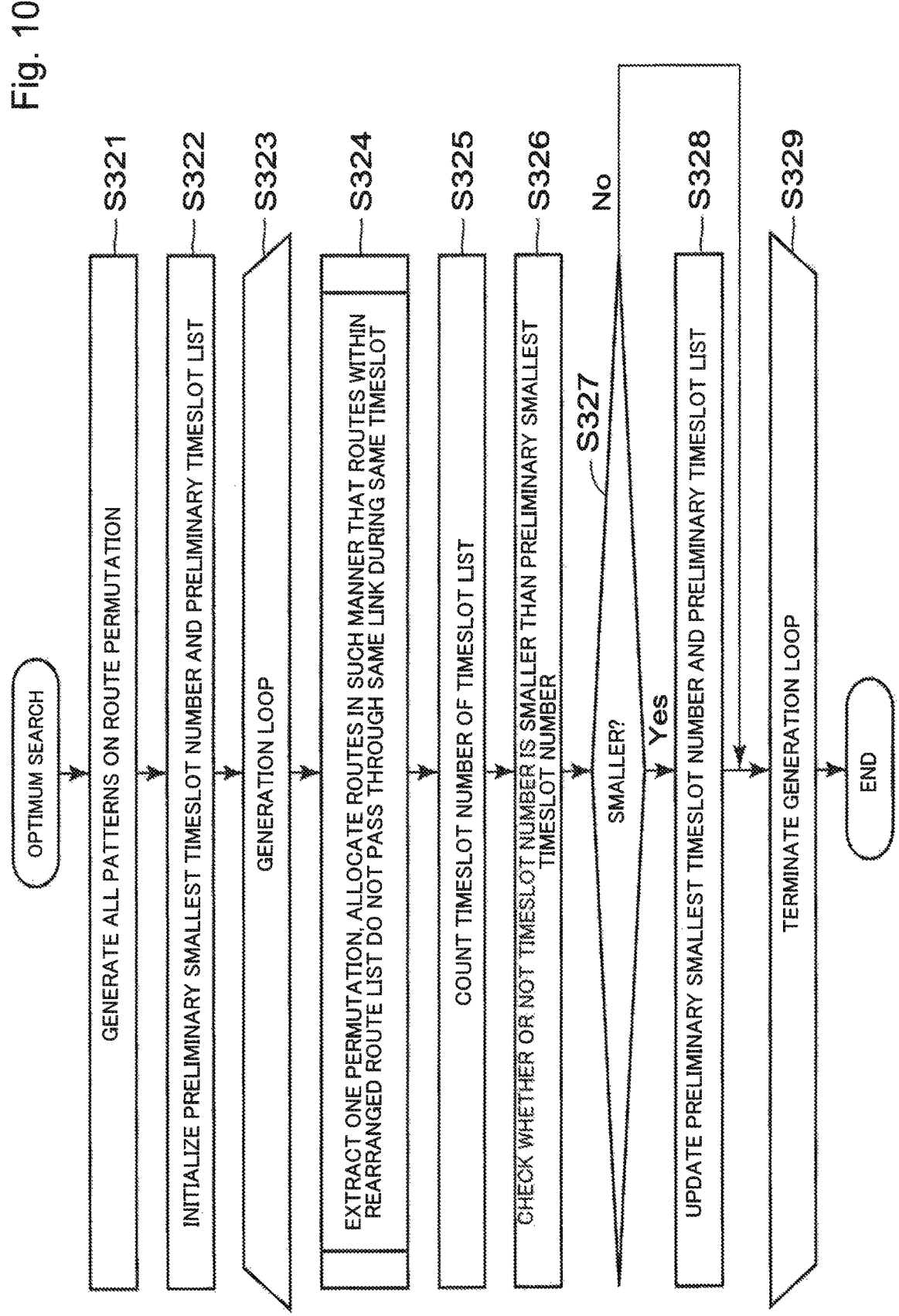
FIG. 10 is a flowchart illustrating an operation of timeslot list generation processing by a comprehensive timeslot allocation means 140.

Next, an operation of the comprehensive timeslot allocation means 140 in the present example embodiment is described with reference to FIG. 10. FIG. 10 is a flowchart illustrating an operation of timeslot list generation processing by the comprehensive timeslot allocation means 140. Specifically, processing of Step S321 to Step S329 illustrated in FIG. 10 corresponds to processing of Step S320 illustrated in FIG. 9.

The comprehensive timeslot allocation means 140 receives a route list as an input. The comprehensive timeslot allocation means 140 generates all patterns on route permutation by rearranging the routes within the route list (Step S321).

The comprehensive timeslot allocation means 140 generates a permutation list including all patterns on route permutation. Then, the comprehensive timeslot allocation means 140 initializes a preliminary smallest timeslot number and a preliminary timeslot list (Step S322). After initialization, the comprehensive timeslot allocation means 140 enters a generation loop (Step S323).

Then, the comprehensive timeslot allocation means 140 extracts one permutation from the permutation list. The comprehensive timeslot allocation means 140 allocates the extracted permutation, in other words, routes within the rearranged route list to communication management information in such a manner that the routes do not pass through a same link during a same time zone (Step S324). Note that processing of Step S324 is the same as processing of Step S120 illustrated in FIG. 2.

Then, the comprehensive timeslot allocation means 140 calculates a timeslot number of a timeslot list generated in Step S324 (Step S325). The comprehensive timeslot allocation means 140 checks whether or not the calculated timeslot number is smaller than the preliminary smallest timeslot number (Step S326).

When the calculated timeslot number is equal to or larger than the preliminary smallest timeslot number (No in Step S327), the comprehensive timeslot allocation means 140 performs processing of Step S324 again.

When the calculated timeslot number is smaller than the preliminary smallest timeslot number (Yes in Step S327), the comprehensive timeslot allocation means 140 updates the preliminary smallest timeslot number to the calculated timeslot number. Further, the comprehensive timeslot allocation means 140 updates the preliminary timeslot list to the timeslot list generated in Step S324 (Step S328). After updating, the comprehensive timeslot allocation means 140 performs processing of Step S324 again.

The comprehensive timeslot allocation means 140 repeats processing of Step S324 to Step S328 during a period when a route list which is not processed within the permutation list is present, in other words, until the permutation list becomes empty. When all the route lists within the permutation list are processed, the comprehensive timeslot allocation means 140 exits from the generation loop (Step S329), and terminates the timeslot list generation processing.

Note that the comprehensive timeslot allocation means 140 may determine a timeslot list having a smallest timeslot number by a method other than a method using a preliminary smallest timeslot number as illustrated in FIG. 10.

[Description on Advantageous Effects]

Next, advantageous effects of the present example embodiment are described. The comprehensive timeslot allocation means in the present example embodiment calculates timeslot numbers of all timeslot lists generatable based on routes within a route list. Thus, since it is possible to generate a timeslot list having a smallest timeslot number, the timeslot list generation device in the present example embodiment is able to more appropriately allocate a route within a given route list to communication management information, as compared with the first and second example embodiments.

Fourth Example Embodiment

Figure 11:
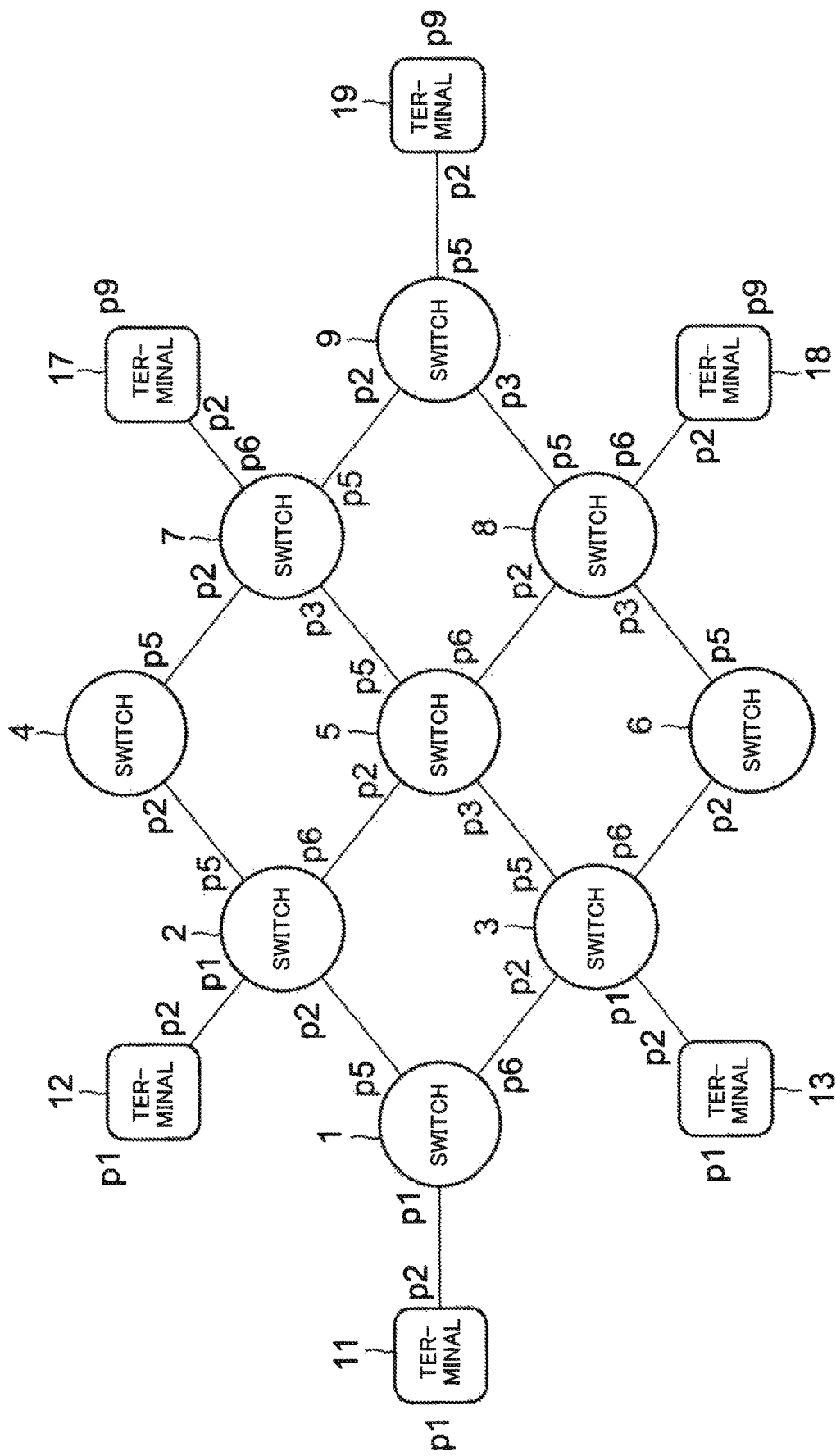
FIG. 11 is an explanatory diagram illustrating an example of a network topology in a range where communication as a processing target in a fourth example embodiment is performed.
Figure 22:
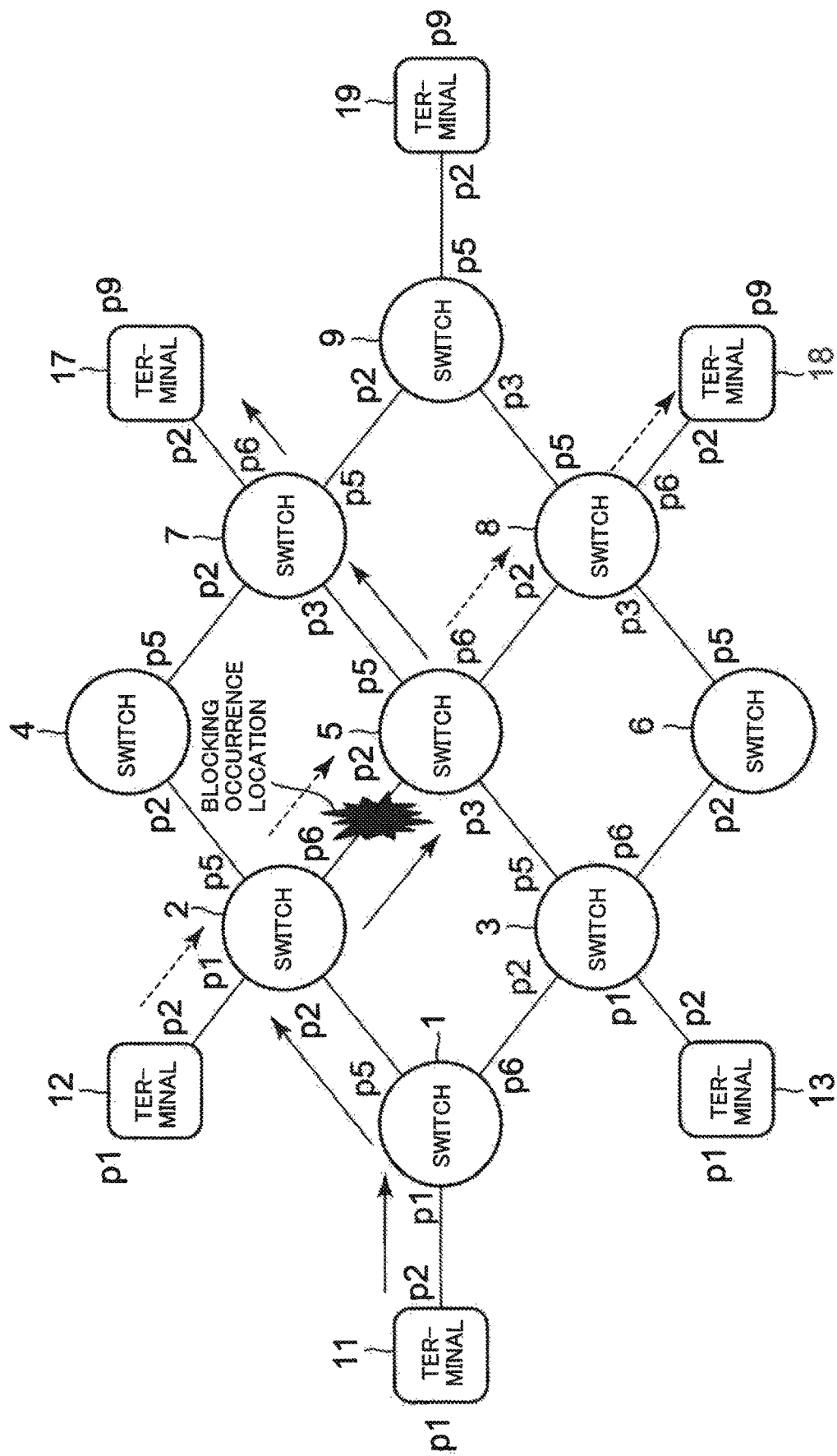
FIG. 22 is an explanatory diagram illustrating an example of communication processing to be performed by using wormhole routing.
Figure 24:
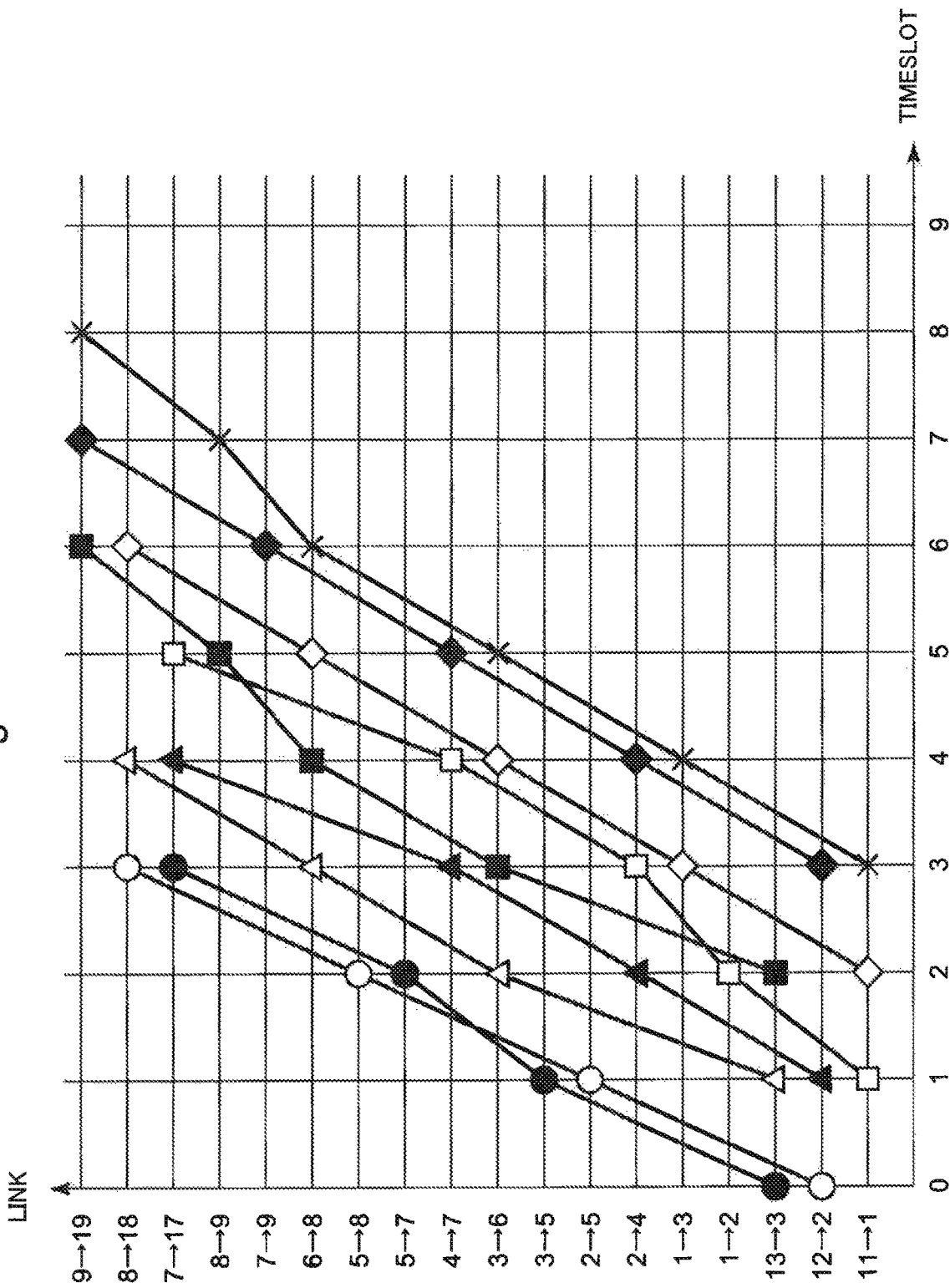
FIG. 24 is a time chart illustrating use timings for each link by communication to be performed based on the timeslot list illustrated in FIG. 23.
Figure 25:
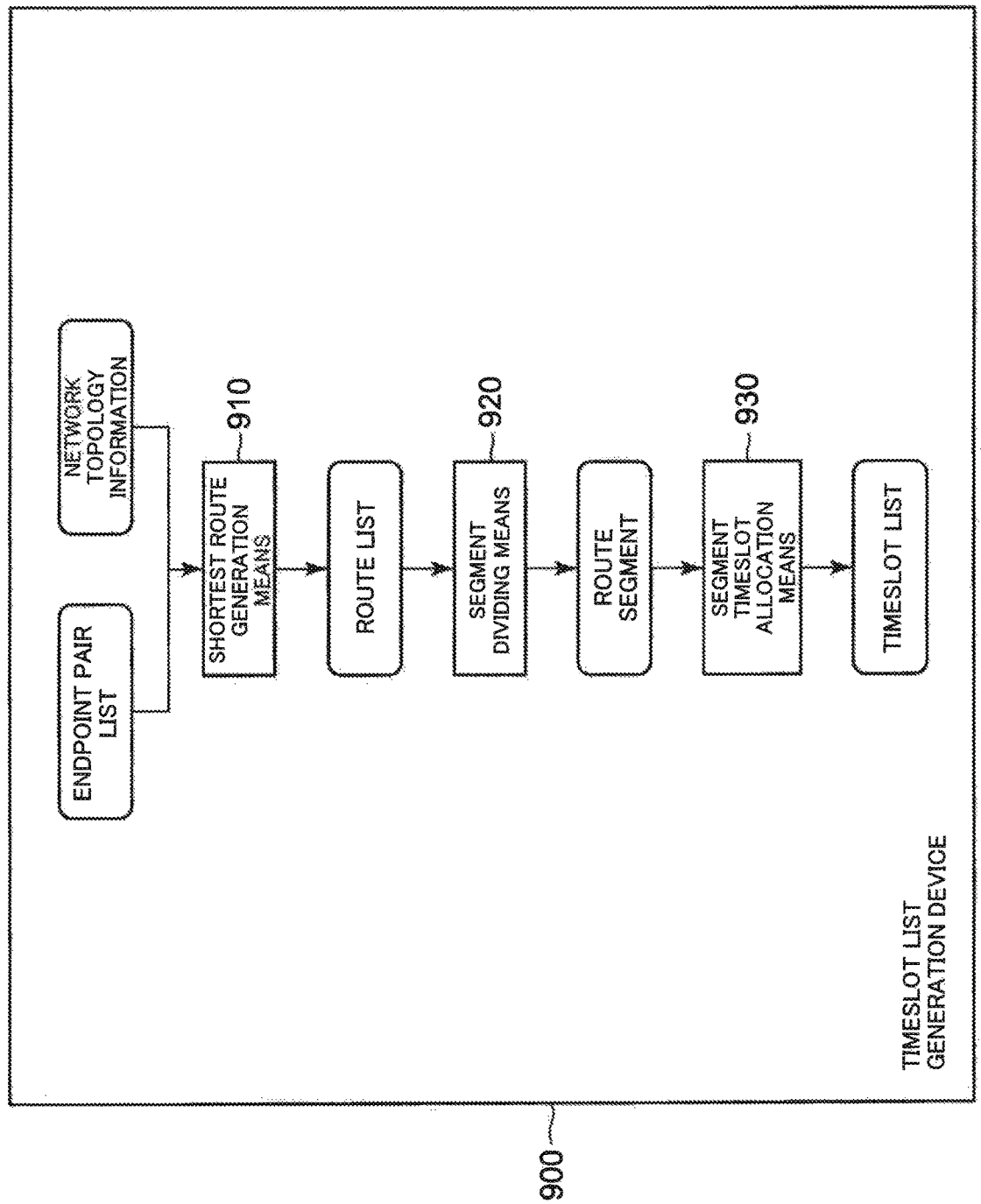
FIG. 25 is a block diagram illustrating a configuration example of a timeslot list generation device described in NPL 1.
Figure 27:
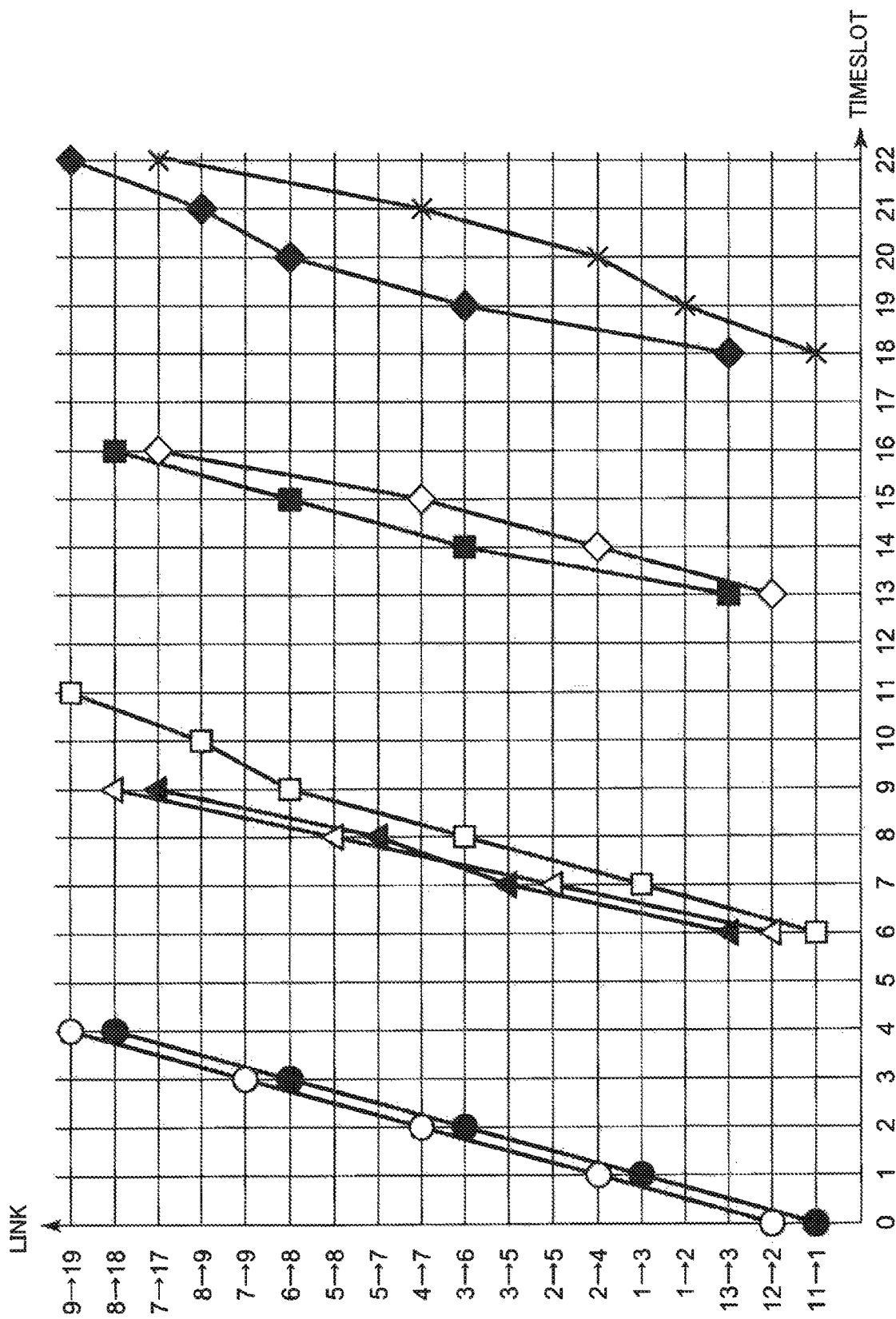
FIG. 27 is a time chart illustrating use timings for each link by communication to be performed based on the timeslot list illustrated in FIG. 26.

In the following, a fourth example embodiment of the present invention is described with reference to the drawings. FIG. 11 is an explanatory diagram illustrating an example of a network topology in a range where communication as a processing target in the present example embodiment is performed. The network topology illustrated in FIG. 11 is identical to a network topology illustrated in FIG. 22. Also in the present example embodiment, in order to simplify description, one packet is handled as one flit.

FIG. 12 is an explanatory diagram illustrating an example of an endpoint pair list to be input to a shortest sparse route generation means 110 in the present example embodiment. The endpoint pair list illustrated in FIG. 12 is constituted by endpoint pair information. The endpoint pair information is constituted by input terminals, input ports, output terminals, and output ports.

An input terminal indicates a terminal serving as a start point of communication. An input port indicates a port of an input terminal serving as a start point of communication. An output terminal indicates a terminal serving as a finish point of communication. An output port indicates a port of an output terminal serving as a finish point of communication. Note that, in order to simplify description, in the present example embodiment, an input port and an output port are not considered.

[Description on Operation]

In the following, an operation of a timeslot list generation device 100 in the present example embodiment is described with reference to FIG. 2, FIG. 7, and FIG. 9.

The shortest sparse route generation means 110 receives the endpoint pair list illustrated in FIG. 12, and the network topology information illustrated in FIG. 11 as an input. Then, the shortest sparse route generation means 110 generates a route list constituted by shortest routes generated based on each piece of endpoint pair information constituting the input endpoint pair list (Step S110, Step S210, Step S310).

FIG. 13 is an explanatory diagram illustrating an example of a route list to be generated by the shortest sparse route generation means 110 in the present example embodiment. The route list is constituted by route information. The route information is constituted by a route name, and an n-th link (where n is a natural number). Each link is a link through which a route associated with a route name passes. Further, an "n-th link" is a link through which a route passes from a start point to a finish point at an n-th time.

Specifically, [V(13)–>V(3)@d=1] being a first link of a path 1 means that "the first (d=1) link of the path 1 is a link between a terminal 13(V(13)) and a switch 3 (V(3))". Further, a portion indicated by an oblique line within route information means that a link associated with the portion is not present. Specifically, a link immediately preceding a portion indicated by an oblique line is a link through which a route passes at a last time. Note that an order of pieces of endpoint pair information illustrated in FIG. 12 does not coincide with an order of pieces of route information illustrated in FIG. 13.

The timeslot allocation means 120 in the first example embodiment generates a timeslot list, in which routes within a route list are all allocated by using the route list illustrated in FIG. 13 as an input (Step S120).

FIG. 14 is an explanatory diagram illustrating an example of a timeslot list to be generated by a timeslot allocation means 120 in the present example embodiment. Further, FIG. 15 is a time chart illustrating use timings for each link by communication to be performed based on the timeslot list illustrated in FIG. 14.

Figure 15:
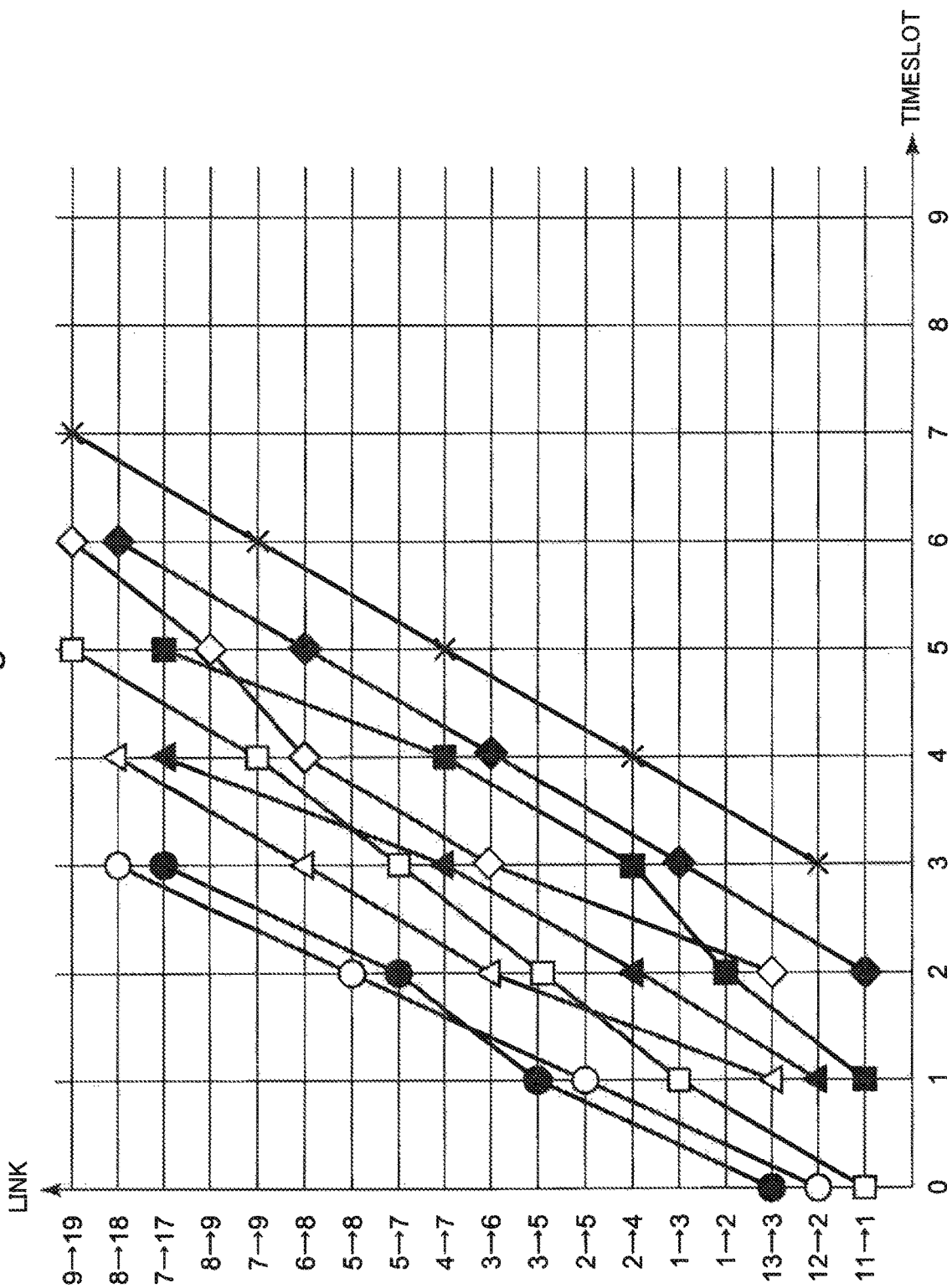
FIG. 15 is a time chart illustrating use timings for each link by communication to be performed based on the timeslot list illustrated in FIG. 14.

A time when overall communication to be performed based on the timeslot list illustrated in FIG. 14 is finished is a time corresponding to a timeslot 8 being a time when communication using a link "switch 9→terminal 19" indicated by a mark x is finished, when the time chart illustrated in FIG. 15 is referred to. Specifically, a timeslot number of the timeslot list illustrated in FIG. 14 is eight. A timeslot number of the timeslot list illustrated in FIG. 14 is reduced to eight, as compared with a timeslot number of the timeslot list illustrated in FIG. 26, which is 23.

Next, an operation of the timeslot list generation device 100 in the second example embodiment is described. The descending order distance route rearranging means 130 in the second example embodiment rearranges routes within a route list in the descending order of sum of distances to other routes by using the route list illustrated in FIG. 13 as an input (Step S220).

FIG. 16 is an explanatory diagram illustrating an example of a rearranged route list to be generated by a descending order distance route rearranging means 130 in the present example embodiment. As compared with the route list illustrated in FIG. 13, routes are rearranged in an order of "path 9", "path 8", "path 7", "path 6", "path 5", "path 4", "path 3", "path 2", and "path 1".

Then, the timeslot allocation means 120 in the second example embodiment generates a timeslot list, in which routes within a route list are all allocated by using the route list illustrated in FIG. 16 as an input (Step S230).

FIG. 17 is an explanatory diagram illustrating another example of a timeslot list to be generated by the timeslot allocation means 120 in the present example embodiment. Further, FIG. 18 is a time chart illustrating use timings for each link by communication to be performed based on the timeslot list illustrated in FIG. 17.

Figure 18:
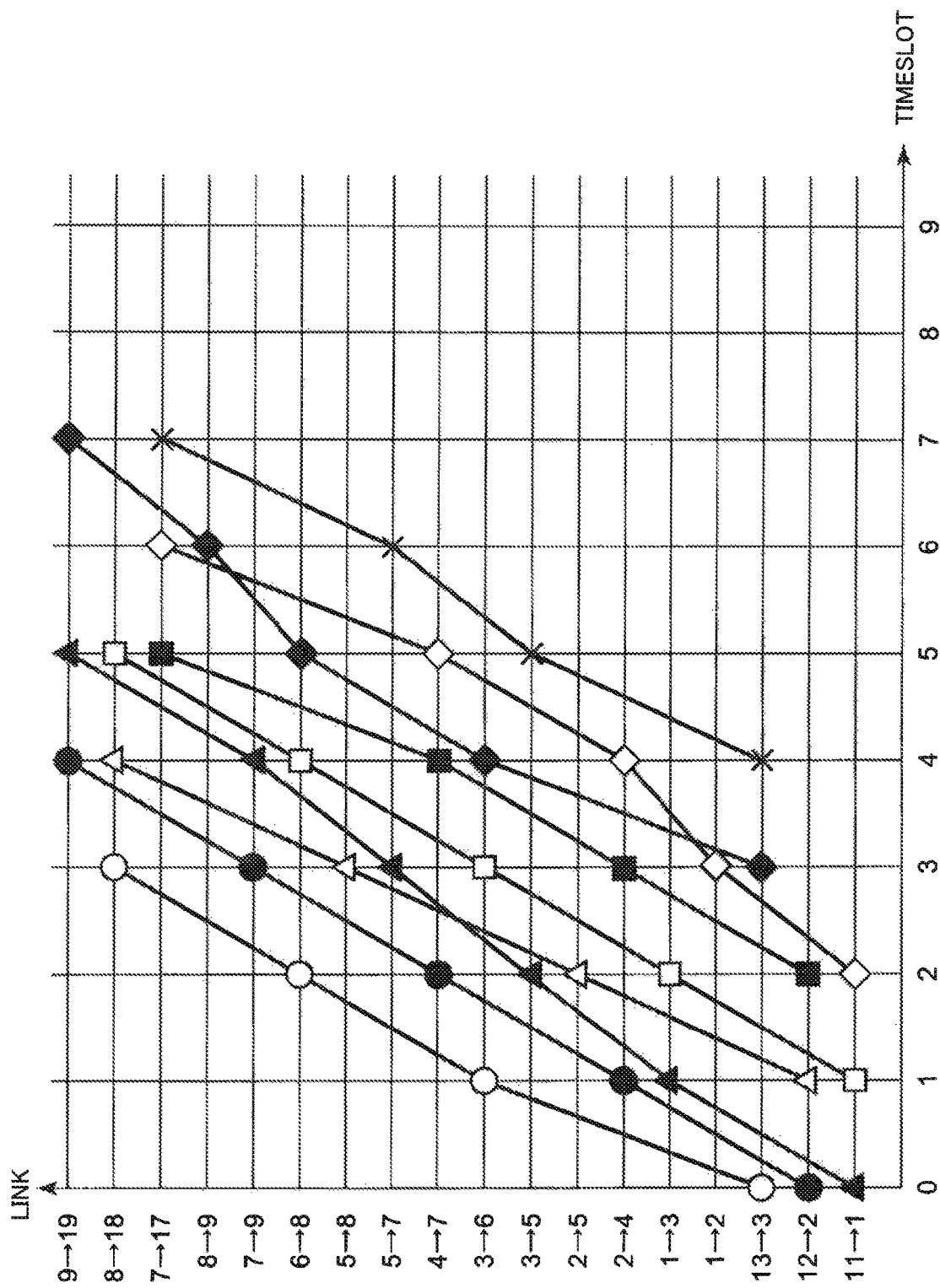
FIG. 18 is a time chart illustrating use timings for each link by communication to be performed based on the timeslot list illustrated in FIG. 17.

A time when overall communication to be performed based on the timeslot list illustrated in FIG. 17 is finished is a time corresponding to a timeslot 8, when the time chart illustrated in FIG. 18 is referred to. The time corresponding to the timeslot 8 is a time when communication using a link "switch 9→terminal 19" indicated by a mark ♦ in FIG. 18, and communication using a link "switch 7→terminal 17" indicated by a mark x in FIG. 18 are finished.

Specifically, a timeslot number of the timeslot list illustrated in FIG. 17 is eight. A timeslot number of the timeslot list illustrated in FIG. 17 is reduced to eight, as compared with a timeslot number of the timeslot list illustrated in FIG. 26, which is 23.

Next, an operation of the timeslot list generation device 100 in the third example embodiment is described. A comprehensive timeslot allocation means 140 in the third example embodiment uses the route list illustrated in FIG. 13 as an input. The comprehensive timeslot allocation means 140 calculates timeslot numbers of all timeslot lists generatable based on routes within a route list, respectively, and determines a timeslot list having a smallest timeslot number (Step S320).

Figure 20:
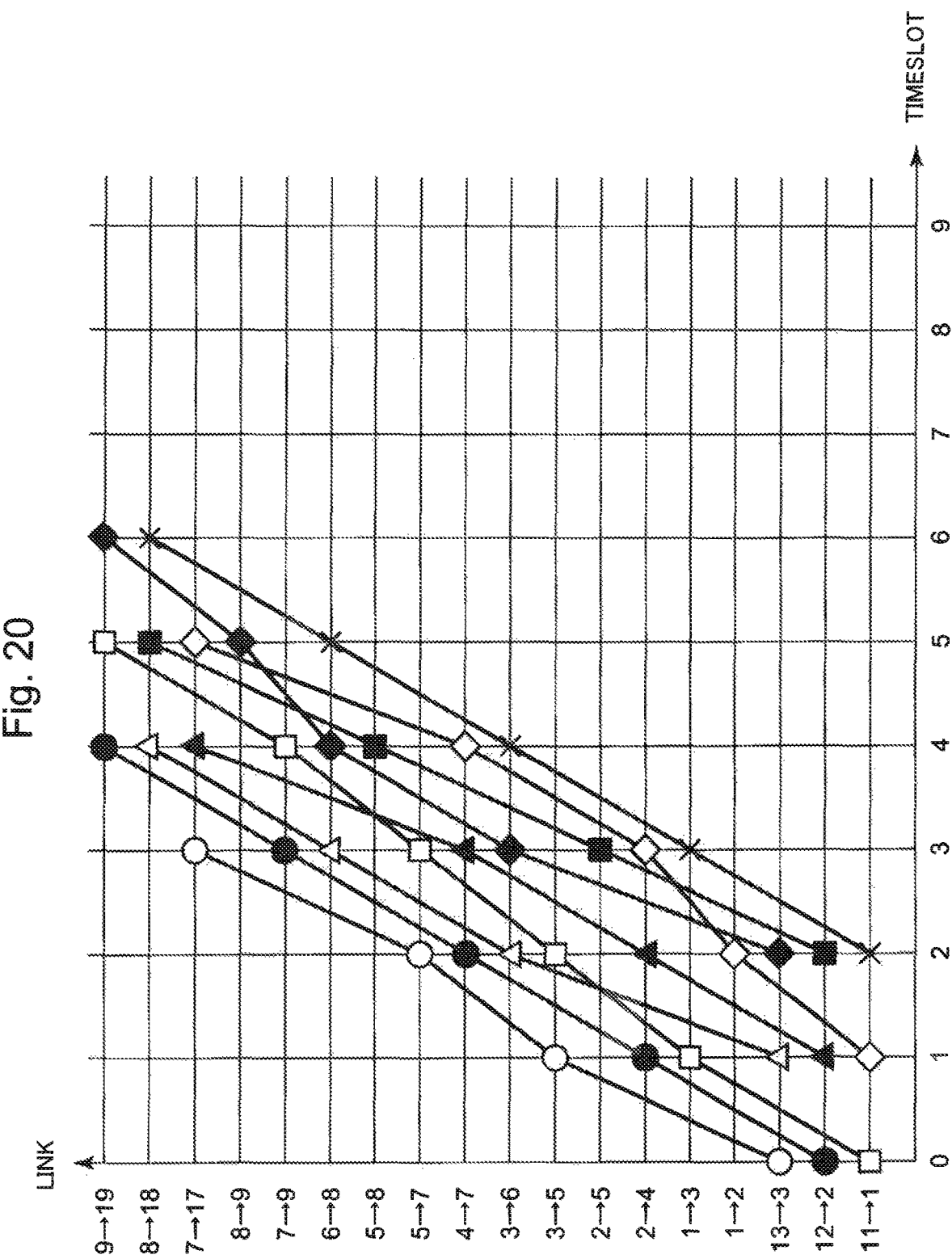
FIG. 20 is a time chart illustrating use timings for each link by communication to be performed based on the timeslot list illustrated in FIG. 19.

FIG. 19 is an explanatory diagram illustrating an example of a timeslot list to be generated by a comprehensive timeslot allocation means 140 in the present example embodiment. Further, FIG. 20 is a time chart illustrating use timings for each link by communication to be performed based on the timeslot list illustrated in FIG. 19. Note that, in FIG. 19, only communication routes in timeslots 0 to 2 are exemplified.

A time when overall communication to be performed based on the timeslot list illustrated in FIG. 19 is finished is a time corresponding to a timeslot 7, when the time chart illustrated in FIG. 20 is referred to. The time corresponding to the timeslot 7 is a time when communication using a link "switch 9→terminal 19" indicated by a mark ♦ in FIG. 20, and communication using a link "switch 8→terminal 18" indicated by a mark x in FIG. 20 are finished.

Specifically, a timeslot number of the timeslot list illustrated in FIG. 19 is seven. A timeslot number of the timeslot list illustrated in FIG. 19 is further reduced to seven, as compared with timeslot numbers of the timeslot lists illustrated in FIG. 14 and FIG. 17, which are eight.

Whereas a time required for generating the timeslot lists illustrated in FIG. 14 and FIG. 17 is about 0.1 second, a time required for generating the timeslot list illustrated in FIG. 19 is about seven seconds. Specifically, a time relating to generation processing by the timeslot list generation device 100 in the third example embodiment is long, as compared with the first and second example embodiments.

Further, it is expected that, as a scale of communication network in which communication is performed increases, a computation time required for generating a timeslot list further increases. Therefore, it is preferable for a user to select a configuration of a timeslot list generation device 100 to be used depending on a scale of communication network, in which communication is performed.

Note that the timeslot list generation device 100 in each of the example embodiments is implemented by a central processing unit (CPU) for executing processing in accordance with a program stored in a storage medium, for example. Specifically, the shortest sparse route generation means 110, the timeslot allocation means 120, the descending order distance route rearranging means 130, and the comprehensive timeslot allocation means 140 are implemented by a CPU for executing processing in accordance with program control, for example.

Further, each component in the timeslot list generation device 100 may be implemented by a hardware circuit.

Figure 21:
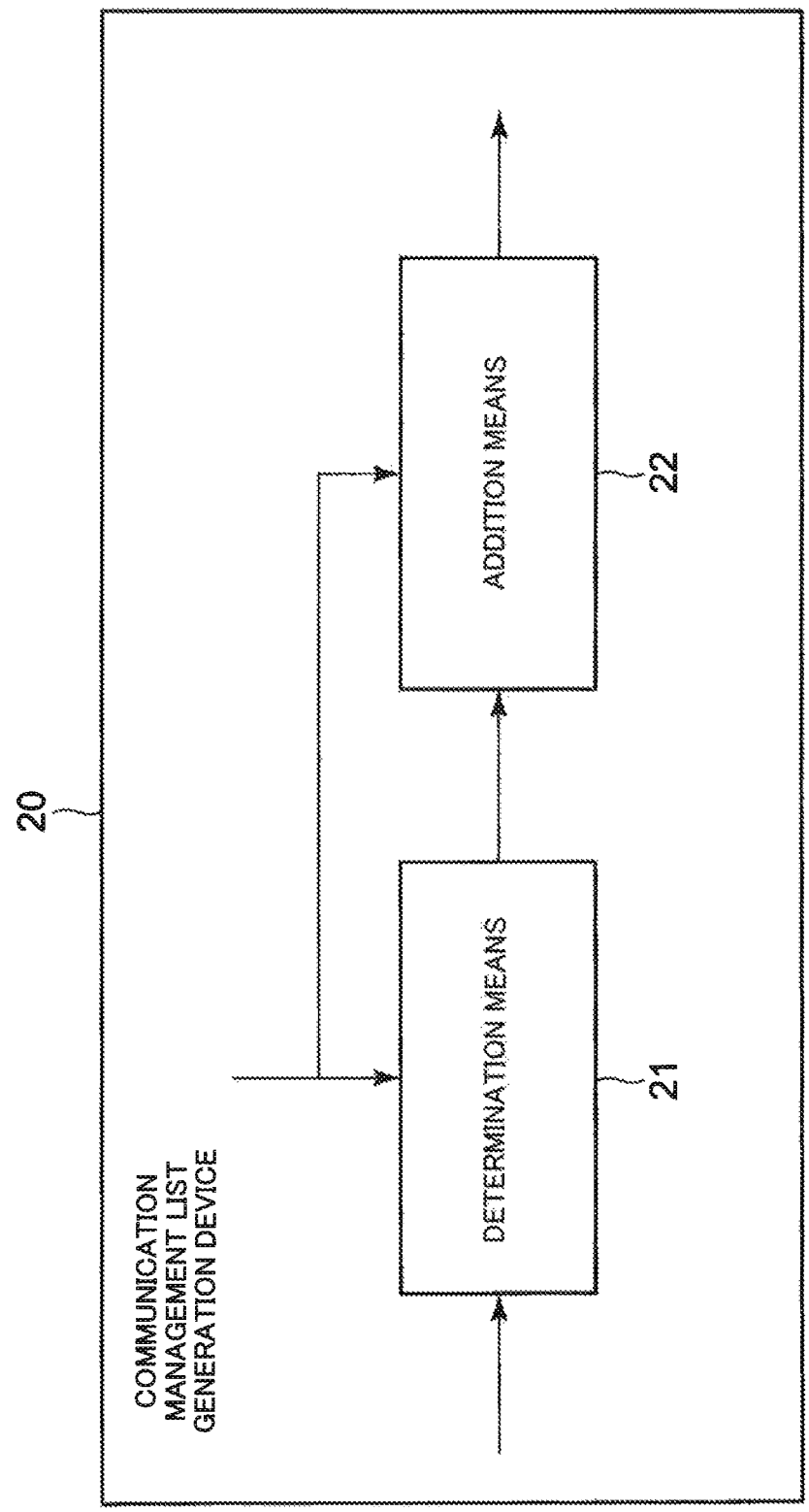
FIG. 21 is a block diagram illustrating an outline of the communication management list generation device according to the present invention.

Next, an outline of the present invention is described. FIG. 21 is a block diagram illustrating an outline of a communication management list generation device according to the present invention. A communication management list generation device 20 according to the present invention is a communication management list generation device for generating a communication management list constituted by communication management information including time information associated with a predetermined time, and communication information indicating communication processing which is started at the predetermined time and which does not use a same route simultaneously. The communication management list generation device 20 includes a determination means 21 (e.g. the timeslot allocation means 120) for determining each piece of communication management information in an ascending order of time associated with the time information regarding whether or not communication processing information is addable to communication information, and an addition means 22 (e.g. the timeslot allocation means 120) for adding communication processing information to communication information of communication management information determined to be addable at a determination stage by the determination means 21.

According to the aforementioned configuration, the communication management list generation device is able to generate a timeslot list with which communication free of blocking is performed at a shorter time interval.

Further, the determination means 21 may determine whether or not communication processing information is addable in a descending order of sum of distances between a shortest route to be used with respect to a plurality of communication processings, and a shortest route to be used by other communication processings.

According to the aforementioned configuration, the communication management list generation device is able to more advantageously reduce a timeslot number of a timeslot list to be generated.

Further, the communication management list generation device 20 may include a measuring means (e.g. the comprehensive timeslot allocation means 140) for measuring a time required for overall communication processing to be performed by using a communication management list generated by adding all pieces of communication processing information as an addition target. The measuring means may output a communication management list having a smallest required time among all patterns on a communication management list to be generated based on communication processing information as an addition target.

According to the aforementioned configuration, the communication management list generation device is able to more appropriately allocate a route within a route list to communication management information.

Further, communication processing information may be shortest route information, in which a sum of distances to a shortest route to be used by other communication processing is maximum among all patterns on a shortest route to be used by communication processing.

According to the aforementioned configuration, the communication management list generation device is able to more easily allocate a route within a route list to communication management information.

Further, the communication management list generation device 20 may include a shortest sparse route generation means (e.g. the shortest sparse route generation means 110) for generating shortest route information as communication processing information by using network topology information and an endpoint pair list as an input. Further, the shortest sparse route generation means may generate a route list being a set of shortest routes, in which passing links do not overlap each other.

According to the aforementioned configuration, the communication management list generation device is able to generate communication route information, in which communication routes do not share a same link simultaneously as much as possible.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2015-202276, filed on Oct. 13, 2015, the disclosure of which is incorporated herein in its entirety by reference.

INDUSTRIAL APPLICABILITY

The present invention is advantageously applicable to design support, in which a route problem or a band problem is detected at the time of designing when a highly reliable virtual communication network is configured. Further, the present invention is also advantageously applicable to setting verification, in which a route problem or a band problem that occurs by erroneous setting is detected, when a highly reliable virtual communication network is configured.

REFERENCE SIGNS LIST

1 to 9 Switch
11 to 13, 17 to 19 Terminal
20 Communication management list generation device
21 Determination means
22 Addition means
100, 900 Timeslot list generation device
110 Shortest sparse route generation means
120 Timeslot allocation means
130 Descending order distance route rearranging means
140 Comprehensive timeslot allocation means
910 Shortest route generation means
920 Segment dividing means
930 Segment timeslot allocation means

What is claimed is:

1. A communication management list generation device comprising:
    a generation unit for generating a communication management list constituted by communication management information including time information associated with a predetermined time, and communication information indicating communication processing which is started at the predetermined time and which does not use a same route simultaneously;
    a determination unit for determining each piece of communication management information in an ascending order of time associated with the time information regarding whether or not communication processing information is addable to communication information; and
    an addition unit for adding the communication processing information to communication information of communication management information which is determined to be addable at a time of determination by the determination unit,
    wherein the communication processing information comprises shortest route information, and wherein data is transmitted over a shortest route selected based on the communication processing information.

2. The communication management list generation device according to claim 1, wherein
    the determination unit determines whether or not communication processing information is addable in a descending order of sum of distances between a shortest route to be used with respect to a plurality of communication processings, and a shortest route to be used by other communication processings.

3. The communication management list generation device according to claim 1, further comprising
    a measuring unit for measuring a time required for overall communication processing to be performed by using a communication management list generated by adding all pieces of communication processing information as an addition target, wherein
    the measuring unit outputs a communication management list having the shortest required time among all patterns on a communication management list to be generated based on communication processing information as the addition target.

4. The communication management list generation device according to claim 1, wherein
    the communication processing information is shortest route information in which a sum of distances to a shortest route to be used by other communication processing is maximum among all patterns on a shortest route to be used by the communication processing.

5. A communication management list generation method comprising:
    generating a communication management list constituted by communication management information including time information associated with a predetermined time, and communication information indicating communication processing which is started at the predetermined time and which does not use a same route simultaneously;

determining each piece of communication management information in an ascending order of time associated with the time information regarding whether or not communication processing information is addable to communication information; and adding the communication processing information to communication information of communication management information which is determined to be addable at a time of determination, wherein the communication processing information comprises shortest route information, and wherein data is transmitted over a shortest route selected based on the communication processing information.

6. The communication management list generation method according to claim 5, further comprising determining whether or not communication processing information is addable in a descending order of sum of distances between a shortest route to be used with respect to a plurality of communication processings, and a shortest route to be used by other communication processings.

7. The communication management list generation method according to claim 5, further comprising:

measuring a time required for overall communication processing to be performed by using a communication management list generated by adding all pieces of communication processing information as an addition target; and outputting a communication management list having the shortest required time among all patterns on a communication management list to be generated based on communication processing information as the addition target.

8. A non-transitory storage medium storing the communication management list generation program causing a computer to execute:

generation processing of generating a communication management list constituted by communication management information including time information associated with a predetermined time, and communication information indicating communication processing which is started at the predetermined time and which does not use a same route simultaneously;

determination processing of determining each piece of communication management information in an ascending order of time associated with the time information regarding whether or not communication processing information is addable to the communication information; and addition processing of adding the communication processing information to communication information of communication management information which is determined to be addable at a time of determination in the determination processing, wherein the communication processing information comprises shortest route information, and wherein data is transmitted over a shortest route selected based on the communication processing information.

9. The non-transitory storage medium storing the communication management list generation program according to claim 8, the communication management list generation program causing the computer to further execute determination processing of determining whether or not communication processing information is addable in a descending order of sum of distances between a shortest route to be used with respect to a plurality of communication processings, and a shortest route to be used by other communication processings.

10. The non-transitory storage medium storing the communication management list generation program according to claim 8, the communication management list generation program causing the computer to further execute:

measuring processing of measuring a time required for overall communication processing to be performed by using a communication management list generated by adding all pieces of communication processing information as an addition target; and output processing of outputting a communication management list having the shortest required time among all patterns on a communication management list to be generated based on communication processing information as the addition target.

* * * * *